US012302436B2

(12) United States Patent
Zhang

(10) Patent No.: US 12,302,436 B2
(45) Date of Patent: May 13, 2025

(54) METHOD AND DEVICE USED IN COMMUNICATION NODE FOR WIRELESS COMMUNICATION

(71) Applicant: Xiaobo Zhang, Shanghai (CN)

(72) Inventor: Xiaobo Zhang, Shanghai (CN)

(73) Assignee: Shanghai Codus Technology Company Limited, Shanghai (CN)

( * ) Notice: Subject to any disclaimer, the term of this patent is extended or adjusted under 35 U.S.C. 154(b) by 714 days.

(21) Appl. No.: 17/676,817

(22) Filed: Feb. 22, 2022

(65) Prior Publication Data

US 2022/0272785 A1 Aug. 25, 2022

(30) Foreign Application Priority Data

Feb. 23, 2021 (CN) .......................... 202110200439.9
Dec. 28, 2021 (CN) .......................... 202111625104.8

(51) Int. Cl.
*H04W 76/20* (2018.01)
*H04W 72/1263* (2023.01)

(52) U.S. Cl.
CPC ....... *H04W 76/20* (2018.02); *H04W 72/1263* (2013.01)

(58) Field of Classification Search
CPC .......................... H04W 76/20; H04W 72/1263
USPC ..................................................... 370/329
See application file for complete search history.

(56) References Cited

FOREIGN PATENT DOCUMENTS

| CN | 101505459 A | 8/2009 |
| CN | 110418348 A | 11/2019 |
| CN | 110505160 A | 11/2019 |

OTHER PUBLICATIONS

Vivo "Dynamic PTM PTP switch for RRC Connected UE" 3GPP TSG-RAN WG2 Meeting #111 electronic R2-2007034 Aug. 7, 2020.
First Office Action of Chinses patent application No. CN202111625104.8 dated Sep. 27, 2023.
First Search Report of Chinses patent application No. CN202111625104.8 dated Sep. 11, 2023.

*Primary Examiner* — Gbemileke J Onamuti

(57) ABSTRACT

The present disclosure provides a method and a device in a communication node for wireless communications. A first node receives a first RRC message, the first RRC message comprises a first field, at least one second field and a third field; receives a second RRC message after receiving the first RRC message, the second RRC message comprises a second field and a fourth field; and determines whether the third field of the first RRC message is applied to the second field of the second RRC message according to the fourth field of the second RRC message. Advantages of this scheme are in that the problem of the bearer configuration of broadcast/multicast, especially the association between PTP branch and PTM branch is solved; and the saved configuration parameters are reused as much as possible to reduce the signaling overhead.

20 Claims, 4 Drawing Sheets

METHOD AND DEVICE USED IN COMMUNICATION NODE FOR WIRELESS COMMUNICATION

CROSS REFERENCE TO RELATED APPLICATIONS

This application claims the priority benefit of Chinese Patent Application No. 202110200439.9, filed on Feb. 23, 2021, and the priority benefit of Chinese Patent Application No. 202111625104.8, filed on Dec. 28, 2021, the full disclosure of which is incorporated herein by reference.

BACKGROUND

Technical Field

The present disclosure relates to transmission methods and devices in wireless communication systems, and in particular to a transmission scheme and device related to multi-connection.

Related Art

Application scenarios of future wireless communication systems are becoming increasingly diversified, and different application scenarios have different performance demands on systems. In order to meet different performance requirements of various application scenarios, 3rd Generation Partner Project (3GPP) Radio Access Network (RAN) #72 plenary decided to conduct the study of New Radio (NR), or what is called fifth Generation (5G). The work Item (WI) of NR was approved at 3GPP RAN #75 plenary to standardize the NR. Broadcast/Multicast transmission technology is widely used in cellular network systems, such as in Multimedia Broadcast Multicast Service (MBMS) in 4G Long Term Evolution (LIE) system. The main feature of the broadcast/multicast transmission is that a network device can transmit same broadcast/multicast data to a plurality of terminal nodes at the same time, which has important value in radio and television, disaster early warning, emergency service, industrial control, Internet of vehicles (IoV) and other scenarios. In LIE MBMS, an eNB schedules a plurality of terminal nodes to receive a Physical Downlink Shared Channel (PDSCH) or Physical Multicast Channel (PMCH) comprising broadcast/multicast data through a Physical Downlink Control Channel (PDCCH). A broadcast/multicast related identifier comprise a Single Cell RNTI (SC-RNTI), a Single Cell Notification RNTI (SC-N-RNTI) and a Group RNTI (G-RNTI).

SUMMARY

The network side can select Point-to-MultiPoint (PTM) or Point-to-MultiPoint (PTP) as the transmission mode of broadcast/multicast data and select the transmission method of PTM or PTP according to user distribution and change of channel state. Data loss may occur during the switching process of the transmission methods of PTP and PTM, in order to support lossless transmission, logical channels used by the PTM transmission and the PTP transmission are usually associated with a same higher-layer entity, such as a same PDCP entity or a same RLC entity. However, there is no scheme on how to configure a bearer of broadcast/multicast to realize an association between the PTP transmission (PTP branch) and the PTM transmission (PTM branch).

To address the above problem, the present disclosure provides a solution. In the statement above, the scenario of Terrestrial Network (TN) is taken as an example; the present disclosure is also applicable to other scenarios, such as Non-Terrestrial Network (NTN) transmission and V2X, where similar technical effects can be achieved. Additionally, the adoption of a unified solution for various scenarios contributes to the reduction of hardware complexity and costs.

In one embodiment, interpretations of the terminology in the present disclosure refer to definitions given in the 3GPP TS36 series.

In one embodiment, interpretations of the terminology in the present disclosure refer to definitions given in the 3GPP TS38 series.

In one embodiment, interpretations of the terminology in the present disclosure refer to definitions given in the 3GPP TS37 series.

In one embodiment, interpretations of the terminology in the present disclosure refer to definitions given in Institute of Electrical and Electronics Engineers (IEEE) protocol specifications.

It should be noted that if no conflict is incurred, embodiments in any node in the present disclosure and the characteristics of the embodiments are also applicable to any other node, and vice versa. And the embodiments in the present disclosure and the characteristics in the embodiments can be arbitrarily combined if there is no conflict.

The present disclosure provides a method in a first node for wireless communications, comprising:
  receiving a first RRC message, the first RRC message comprising a first field, at least one second field and a third field; receiving a second RRC message after receiving the first RRC message, the second RRC message comprising a second field and a fourth field; determining whether the third field of the first RRC message is applied to the second field of the second RRC message according to the fourth field of the second RRC message;
  herein, the second field comprises a logical channel identity (ID); the first RRC message is used to configure a cell group, and a cell group configured by the first RRC message is identified by the first field of the first RRC message; the fourth field and the first field are two different fields.

In one embodiment, the first RRC message is a CellGroupConfig IE, the first field is a CellGroupId field, and the second field is an RLC-BearerConfig field.

In one subembodiment of the above embodiment, a comment text tag of the third field is Need M.

In one subembodiment of the above embodiment, a comment text tag of the third field is Need N.

In one subembodiment of the above embodiment, a comment text tag of the third field is Need R.

In one subembodiment of the above embodiment, a comment text tag of the third field is Need S.

In one subembodiment of the above embodiment, a comment text tag of the third field is mac-CellGroupConfig.

In one subembodiment of the above embodiment, the third field comprises at least one of a mac-CellGroupConfig field, a physicalCellGroupConfig field, or a spCellConfig field.

In one embodiment, the first RRC message comprises a Radio Resource Control (RRC) message.

In one embodiment, the first RRC message comprises all or partial IEs in an RRC message.

In one embodiment, the first RRC message comprises all or partial fields in an IE in an RRC message.

In one embodiment, a cell group configured by the first RRC message comprises at least one of a Master Cell Group (MCG) or a Secondary Cell Group (SCG).

In one embodiment, the first RRC message is a CellGroupConfig IE, the first field is a CellGroupId field, and the second field is an RLC-BearerConfig field.

In one embodiment, the second RRC message is a CellGroupConfig IE.

In one subembodiment of the above embodiment, the first field is not present in the second RRC message.

In one subembodiment of the above embodiment, the fourth field is not present in the first RRC message.

In one subembodiment of the above embodiment, a value range of the fourth field is the same as a value range of the first field.

In one embodiment, the second RRC message is a CellGroupConfig IE, the second field is an RLC-BearerConfig field, and the fourth field is a servedRadioBearer field.

In one embodiment, the second RRC message is a CellGroupConfig IE, the second field is an RLC-BearerConfig field, and the fourth field is an associatedServedRadioBearer field.

In one embodiment, the second RRC message is an RLC-BearerConfig field.

In one subembodiment of the above embodiment, the second field of the second RRC message is the second RRC message.

In one subembodiment of the above embodiment, the second field of the second RRC message comprises all or partial fields in the second RRC message.

In one subembodiment of the above embodiment, the second field of the second RRC message comprises all or partial field IEs in the second RRC message.

In one subembodiment of the above embodiment, the fourth field is a servedRadioBearer field.

In one subembodiment of the above embodiment, the fourth field is an associatedServedRadioBearer field.

In one embodiment, the fourth field of the second RRC message belongs to the second field of the second RRC message.

In one embodiment, the second RRC message is an rlc-BearerToAddModList field, and the second RRC message comprises one or a plurality of RLC-BearerConfig fields.

In one subembodiment of the above embodiment, the second field is an RLC-BearerConfig field, and the second field of the second RRC message is one of the one or a plurality of RLC-BearerConfig fields.

In one embodiment, a cell group configured by the second RRC message is associated with at least one of an MCG or an SCG.

In one embodiment, the second RRC message is used for a configuration of an RLC entity, a connection with a PDCP entity and a corresponding logical channel in MAC.

In one embodiment, the second RRC message is used for configuring at least one of an RLC entity, an association with a PDCP entity or a corresponding logical channel in MAC.

In one subembodiment of the above embodiment, the corresponding logical channel in MAC is a logical channel corresponding to an RLC entity configured by the second RRC message.

In one subembodiment of the above embodiment, the association with a PDCP entity indicates a radio bearer served by an RLC entity configured by the second RRC message.

In one embodiment, the behavior of determining whether the third field of the first RRC message is applied to the second field of the second RRC message according to the fourth field of the second RRC message includes: determining whether the third field of the first RRC message is applied to the second field of the second RRC message according to whether a value of the fourth field of the second RRC message is the same as a value of the first field of the first RRC message.

In one embodiment, the first RRC message comprises at least one fourth field; the behavior of determining whether the third field of the first RRC message is applied to the second field of the second RRC message according to the fourth field of the second RRC message includes: determining whether the third field of the first RRC message is applied to the second field of the second RRC message according to whether a value of the fourth field of the second RRC message is the same as a value of at least one the fourth field of the first RRC message.

In one embodiment, the behavior of applying the third field of the first RRC message to the second field of the second RRC message includes: using a current value of the third field.

In one embodiment, the behavior of applying the third field of the first RRC message to the second field of the second RRC message includes: using a previously configured value of the third field.

In one embodiment, a current value of the third field is a value of the third field of the first RRC message.

In one embodiment, a previously configured value of the third field is a value of the third field of the first RRC message.

In one embodiment, the phrase of the fourth field and the first field being two different fields includes: the fourth field and the first field respectively correspond to different IEs.

In one embodiment, the phrase of the fourth field and the first field being two different fields includes: a value range of the fourth field is different from a name of the first field.

According to one aspect of the present disclosure, it is characterized in that the behavior of determining whether the third field of the first RRC message is applied to the second field of the second RRC message according to the fourth field of the second RRC message includes: if a value of the fourth field of the second RRC message is the same as a value of the first field of the first RRC message, the third field of the first RRC message is applied to the second field of the second RRC message; if a value of the fourth field of the second RRC message is different from a value of the first field of the first RRC message, the third field of the first RRC message is not applied to the second field of the second RRC message; the first field is not present in the second RRC message, or the fourth field is not present in the first RRC message.

In one embodiment, the first RRC message is a CellGroupConfig IE, the first field is a CellGroupId field, the second field is an RLC-BearerConfig field, the second RRC message is a CellGroupConfig IE, and the second RRC message is a CellGroupConfig IE.

In one subembodiment of the above embodiment, the fourth field is an associatedCellGroupId field.

In one subembodiment of the above embodiment, the second RRC message is used to configure a cell group, and a cell group configured by the second RRC message is identified by the fourth field of the second RRC message.

In one subembodiment of the above embodiment, the third field is a mac-CellGroupConfig field; the behavior of applying the third field of the first RRC message to the second field of the second RRC message includes: a cell group configured by the second RRC message uses a MAC parameter configured by the third field of the first RRC message.

In one subembodiment of the above embodiment, the third field is a physicalCellGroupConfig field; the behavior of applying the third field of the first RRC message to the second field of the second RRC message includes: a cell group configured by the second RRC message uses an L1 parameter configured by the third field of the first RRC message.

In one subembodiment of the above embodiment, the third field is a spCellConfig field; the behavior of applying the third field of the first RRC message to the second field of the second RRC message includes: a cell group configured by the second RRC message uses a special cell parameter configured by the third field of the first RRC message.

In one subembodiment of the above embodiment, the behavior of applying the third field of the first RRC message to the second field of the second RRC message includes: not applying the third field of the first RRC message to a cell group configured by the second RRC message.

According to another aspect of the present disclosure, it is characterized in that the first RRC message comprises at least one fourth field; the behavior of determining whether the third field of the first RRC message is applied to the second field of the second RRC message according to the fourth field of the second RRC message includes: if a value of the fourth field of the second RRC message is the same as a value of at least one the fourth field of the first RRC message, the third field of the first RRC message is applied to the second field of the second RRC message; if a value of the fourth field of the second RRC message is different from a value of any fourth field of the first RRC message, the third field of the first RRC message is not applied to the second field of the second RRC message.

In one embodiment, the first RRC message is a CellGroupConfig IE, the second field is an RLC-BearerConfig field, and the fourth field is a servedRadioBearer field; the second RRC message is an RLC-BearerConfig field.

In one subembodiment of the above embodiment, a radio bearer served by an RLC entity configured by the second RRC message is identified by the fourth field of the second RRC message.

In one subembodiment of the above embodiment, a radio bearer served by an RLC entity configured by any second field of the first RRC message is identified by the fourth field in the any second field of the first RRC message.

In one subembodiment of the above embodiment, a value of the fourth field of the second RRC message being the same as a value of at least one the fourth field of the first RRC message includes: a radio bearer identified by at least one the fourth field of the first RRC message is the same as a radio bearer identified by the fourth field of the second RRC message; a cell group to which an RLC entity configured by the second RRC message belongs is a cell group configured by the first RRC message.

In one subembodiment of the above embodiment, a value of the fourth field of the second RRC message being the same as a value of at least one the fourth field of the first RRC message includes: a cell group to which an RLC entity configured by the second RRC message belongs is a cell group configured by the first RRC message.

In one subembodiment of the above embodiment, the third field is a mac-CellGroupConfig field; the behavior of applying the third field of the first RRC message to the second field of the second RRC message includes: a cell group to which an RLC entity configured by the second RRC message belongs uses a MAC parameter configured by the third field of the first RRC message.

In one subembodiment of the above embodiment, the third field is a physicalCellGroupConfig field; the behavior of applying the third field of the first RRC message to the second field of the second RRC message includes: a cell group to which an RLC entity configured by the second RRC message belongs uses an L1 parameter configured by the third field of the first RRC message.

In one subembodiment of the above embodiment, the third field is a spCellConfig field; the behavior of applying the third field of the first RRC message to the second field of the second RRC message includes: a cell group to which an RLC entity configured by the second RRC message belongs uses a special cell parameter configured by the third field of the first RRC message.

In one subembodiment of the above embodiment, the behavior of not applying the third field of the first RRC message to the second field of the second RRC message includes: not apply the third field of the first RRC message to a cell group to which an RLC entity configured by the second RRC message belongs.

The present disclosure provides a method in a second node for wireless communications, comprising:
  transmitting a first RRC message, the first RRC message comprising a first field, at least one second field and a third field; transmitting a second RRC message after transmitting the first RRC message, the second RRC message comprising a second field and a fourth field;
  herein, the second field comprises a logical channel ID; the first RRC message is used to configure a cell group, and a cell group configured by the first RRC message is identified by the first field of the first RRC message; the fourth field of the second RRC message is used to determine whether the third field of the first RRC message is applied to the second field of the second RRC message; the fourth field and the first field are two different fields.

The present disclosure provides a first node for wireless communications, comprising:
  a first receiver, receiving a first RRC message, the first RRC message comprising a first field, at least one second field and a third field; receiving a second RRC message after receiving the first RRC message, the second RRC message comprising a second field and a fourth field; determining whether the third field of the first RRC message is applied to the second field of the second RRC message according to the fourth field of the second RRC message;
  herein, the second field comprises a logical channel ID; the first RRC message is used to configure a cell group, and a cell group configured by the first RRC message is identified by the first field of the first RRC message; the fourth field and the first field are two different fields.

In one embodiment, the first RRC message is a CellGroupConfig IE, the first field is a CellGroupId field, and the second field is an RLC-BearerConfig field.

The present disclosure provides a second node for wireless communications, comprising:
  a second transmitter, transmitting a first RRC message, the first RRC message comprising a first field, at least one second field and a third field; and transmitting a second RRC message after transmitting the first RRC message, the second RRC message comprising a second field and a fourth field;

herein, the second field comprises a logical channel ID; the first RRC message is used to configure a cell group, and a cell group configured by the first RRC message is identified by the first field of the first RRC message; the fourth field of the second RRC message is used to determine whether the third field of the first RRC message is applied to the second field of the second RRC message; the fourth field and the first field are two different fields.

In one embodiment, a problem to be solved in the present disclosure includes: the problem of the bearer configuration of broadcast/multicast, especially the association between the PTP branch and the PTM branch.

In one embodiment, advantages of the above method include: the saved configuration parameters are reused as much as possible to reduce the signaling overhead.

In one embodiment, advantages of the above method include: reuse the existing data structure is reused to the greatest extent to reduce the standard workload.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
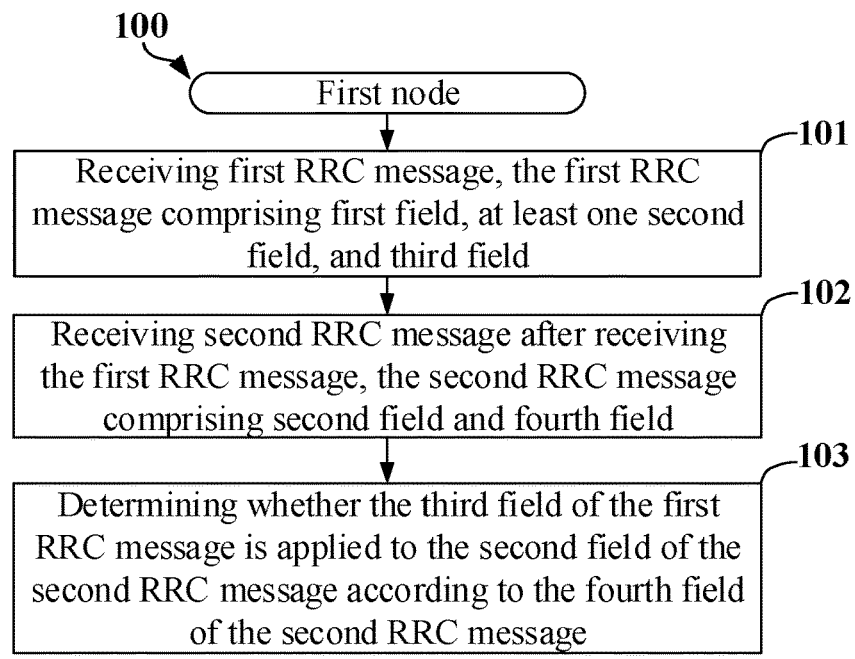
FIG. 1 is a flowchart of transmission of a first signaling according to one embodiment of the present disclosure.

Embodiment 1 illustrates a schematic diagram of transmission of a first signaling according to one embodiment of the present disclosure, as shown in FIG. 1. In FIG. 1, each box represents a step. Particularly, the sequential order of steps in these boxes does not necessarily mean that the steps are chronologically arranged.

In embodiment 1, the first node in the present disclosure receives a first RRC message in step 101, and the first RRC message comprises a first field, at least one second field, and a third field; in step 102, receives a second RRC message after receiving the first RRC message, the second RRC message comprises a second field and a fourth field; and in step 103, determines whether the third field of the first RRC message is applied to the second field of the second RRC message according to the fourth field of the second RRC message;

herein, the second field comprises a logical channel ID; the first RRC message is used to configure a cell group, and a cell group configured by the first RRC message is identified by the first field of the first RRC message; the fourth field and the first field are two different fields.

In one embodiment, the first RRC message is a CellGroupConfig IE, the first field is a CellGroupId field, and the second field is an RLC-BearerConfig field.

In one subembodiment of the above embodiment, a comment text tag of the third field is Need M.

In one subembodiment of the above embodiment, a comment text tag of the third field is Need N.

In one subembodiment of the above embodiment, a comment text tag of the third field is Need R.

In one subembodiment of the above embodiment, a comment text tag of the third field is Need S.

In one subembodiment of the above embodiment, a comment text tag of the third field is mac-CellGroupConfig.

In one subembodiment of the above embodiment, the third field is a mac-CellGroupConfig field.

In one subembodiment of the above embodiment, the third field is a physicalCellGroupConfig field.

In one subembodiment of the above embodiment, the third field is a spCellConfig field.

In one subembodiment of the above embodiment, the third field comprises at least one of a mac-CellGroupConfig field, a physicalCellGroupConfig field, or a spCellConfig field.

In one subembodiment of the above embodiment, the second field is used for a configuration of an RLC entity, a connection with a PDCP entity and a corresponding logical channel in MAC.

In one subembodiment of the above embodiment, the corresponding logical channel in MAC is a logical channel corresponding to an RLC entity configured by the second field.

In one subembodiment of the above embodiment, the logical channel corresponding in MAC is a logical channel configured by the second field.

In one subembodiment of the above embodiment, the association with a PDCP entity indicates a radio bearer served by an RLC entity configured by the second field.

In one subembodiment of the above embodiment, the PDCP entity belongs to a radio bearer served by an RLC entity configured by the second RRC message.

In one embodiment, the first RRC message comprises all or part of an RRCReconfiguration message.

In one embodiment, the first RRC message comprises all or part of an RRCConnectionReconfiguration message.

In one embodiment, the first RRC message comprises an RRC message.

In one embodiment, the first RRC message comprises all or partial IEs in an RRC message.

In one embodiment, the first RRC message comprises all or partial fields in an IE in an RRC message.

In one embodiment, the first RRC message comprises K second fields, the one second field is one of the K second fields, K being a positive integer greater than 1.

In one subembodiment of the above embodiment, K is equal to 32.

In one subembodiment of the above embodiment, K is not greater than 10000.

In one embodiment, the first RRC message comprises a plurality of second fields, and the second field is one of the plurality of second fields.

In one embodiment, a cell group configured by the first RRC message comprises at least one of an MCG or an SCG.

In one embodiment, a logical channel identified by a logical channel ID in at least one second field of the first RRC message belongs to a PTP branch of a first radio bearer.

In one embodiment, a logical channel identified by a logical channel ID in at least one second field of the first RRC message belongs to a PTM branch of a first radio bearer.

In one embodiment, the PTP branch in the present disclosure comprises leg.

In one embodiment, the PTP branch in the present disclosure comprises link.

In one embodiment, the PTP branch in the present disclosure comprises branch.

In one embodiment, the PTP branch in the present disclosure comprises an RLC bearer.

In one embodiment, the PTP branch in the present disclosure comprises an RLC channel.

In one embodiment, the PTP branch in the present disclosure comprises an RLC entity.

In one embodiment, the PTM branch in the present disclosure comprises leg.

In one embodiment, the PTM branch in the present disclosure comprises link.

In one embodiment, the PTM branch in the present disclosure comprises branch.

In one embodiment, the PTM branch in the present disclosure comprises an RLC bearer.

In one embodiment, the PTM branch in the present disclosure comprises an RLC channel.

In one embodiment, the PTM branch in the present disclosure comprises an RLC entity.

In one embodiment, at least one second field of the first RRC message comprises the fourth field, and the first radio bearer is identified by the fourth field in at least one second field of the first RRC message.

In one embodiment, the first RRC message is a CellGroupConfig IE, the first field is a CellGroupId field, the second field is an RLC-BearerConfig field, and the fourth field is a servedRadioBearer field.

In one embodiment, the first RRC message is a CellGroupConfig IE, the first field is a CellGroupId field, the second field is an RLC-BearerConfig field, and the fourth field is an associatedServedRadioBearer field.

In one embodiment, the first radio bearer is a Signalling Radio Bearer (SRB).

In one embodiment, the first radio bearer is a Data Radio Bearer (DRB).

In one embodiment, the first radio bearer is a Multicast Radio Bearer (MRB).

In one embodiment, the first radio bearer is a Multicast and Broadcast Service-Radio Bearer (MBS-RB).

In one embodiment, the first radio bearer is a Single Cell-Multicast Radio Bearer (SC-MRB).

In one embodiment, the second RRC message is used to configure a cell group.

In one subembodiment of the above embodiment, the cell group configured by the second RRC message reuses partial or all parameters of a configured cell group.

In one subembodiment of the above embodiment, a cell group configured by the second RRC message corresponds to a configured cell group, and the configured cell group is identified by the fourth field of the second RRC message.

In one subembodiment of the above embodiment, a cell group configured by the second RRC message is identified by the fourth field of the second RRC message.

In one subembodiment of the above embodiment, a cell group configured by the second RRC message does not have a cell group ID.

In one subembodiment of the above embodiment, a cell group configured by the second RRC message is a virtual cell group.

In one embodiment, a cell group identified by the fourth field of the second RRC message comprises at least one of a Master Cell Group (MCG) or a Secondary Cell Group (SCG).

In one embodiment, the second field of the second RRC message is used for a configuration of an RLC entity, a connection with a PDCP entity and a corresponding logical channel in MAC.

In one embodiment, the second field of the second RRC message is used for configuring at least one of an RLC entity, an association with a PDCP entity or a corresponding logical channel in MAC.

In one subembodiment of the above embodiment, the corresponding logical channel in MAC is a logical channel corresponding to an RLC entity configured by the second RRC message.

In one subembodiment of the above embodiment, the logical channel corresponding in MAC is a logical channel configured by the second field configured by the second RRC message.

In one subembodiment of the above embodiment, the association with a PDCP entity indicates a radio bearer served by an RLC entity configured by the second RRC message.

In one subembodiment of the above embodiment, the PDCP entity belongs to a radio bearer served by an RLC entity configured by the second RRC message.

In one subembodiment of the above embodiment, the PDCP entity is a PDCP entity associated with an RLC entity configured by the second RRC message.

In one subembodiment of the above embodiment, an RLC entity configured by the second field of the second RRC message is an RLC entity configured by the second RRC message.

In one subembodiment of the above embodiment, a logical channel configured by the second field of the second RRC message is a logical channel configured by the second RRC message.

In one embodiment, the second RRC message is a CellGroupConfig IE.

In one subembodiment of the above embodiment, the first field is not present in the second RRC message.

In one subembodiment of the above embodiment, the fourth field is not present in the first RRC message.

In one subembodiment of the above embodiment, a value range of the fourth field is the same as a value range of the first field.

In one subembodiment of the above embodiment, a value range of the fourth field is different from a value range of the first field.

In one subembodiment of the above embodiment, the second field comprises all or partial fields in an IE.

In one subembodiment of the above embodiment, the fourth field comprises all or partial fields in an IE.

In one embodiment, the second RRC message comprises all or part of an RRCReconfiguration message.

In one embodiment, the second RRC message comprises all or part of an RRCConnectionReconfiguration message.

In one embodiment, the second RRC message comprises an RRC message.

In one embodiment, the second RRC message comprises all or partial IEs in an RRC message.

In one embodiment, the second RRC message comprises all or partial fields in an IE in an RRC Message.

In one embodiment, a logical channel identified by a logical channel ID in the second field of the second RRC message belongs to a PTP branch of a second radio bearer.

In one embodiment, a logical channel identified by a logical channel ID in the second field of the second RRC message belongs to a PTM branch of a second radio bearer.

In one embodiment, the first radio bearer is the same as the second radio bearer.

In one embodiment, the second radio bearer is different from the second radio bearer.

In one embodiment, the second radio bearer is an SRB.

In one embodiment, the second radio bearer is a DRB.

In one embodiment, the second radio bearer is an MRB.

In one embodiment, the second radio bearer is an MBS-RB.

In one embodiment, the second radio bearer is a Single Cell Multicast Radio Bearer (SC-MRB).

In one embodiment, the second field of the first RRC message comprises the fourth field, and the second radio bearer is identified by the fourth field in the second field of the second RRC message.

In one embodiment, the second RRC message is a CellGroupConfig IE, the second field is an RLC-BearerConfig field, and the fourth field is a servedRadioBearer field.

In one embodiment, the second RRC message is a CellGroupConfig IE, the second field is an RLC-BearerConfig field, and the fourth field is an associatedServedRadioBearer field.

In one embodiment, the second RRC message is used for at least one of configuration of an RLC entity, a corresponding logical channel in MAC, or in an associated PDCP entity.

In one embodiment, the second RRC message is used for configuration of an RLC entity, a corresponding logical channel in MAC, and in an associated PDCP entity.

In one embodiment, the second RRC message is used for a configuration of an RLC entity, a connection with a PDCP entity and a corresponding logical channel in MAC.

In one embodiment, the second RRC message is used for configuring at least one of an RLC entity, an association with a PDCP entity or a corresponding logical channel in MAC.

In one subembodiment of the above embodiment, the corresponding logical channel in MAC is a logical channel corresponding to an RLC entity configured by the second RRC message.

In one subembodiment of the above embodiment, the association with a PDCP entity indicates a radio bearer served by an RLC entity configured by the second RRC message.

In one subembodiment of the above embodiment, the PDCP entity belongs to a radio bearer served by an RLC entity configured by the second RRC message.

In one subembodiment of the above embodiment, the PDCP entity is a PDCP entity associated with an RLC entity configured by the second RRC message.

In one subembodiment of the above embodiment, an RLC entity configured by the second field of the second RRC message is an RLC entity configured by the second RRC message.

In one subembodiment of the above embodiment, a logical channel configured by the second field of the second RRC message is a logical channel configured by the second RRC message.

In one embodiment, an RLC entity configured by the second RRC message is identified by the fourth field.

In one embodiment, a logical channel corresponding in MAC configured by the second RRC message is identified by the fourth field.

In one embodiment, the second RRC message is an RLC-BearerConfig field.

In one subembodiment of the above embodiment, the second field of the second RRC message is the second RRC message.

In one subembodiment of the above embodiment, the second field of the second RRC message comprises all or partial fields in the second RRC message.

In one subembodiment of the above embodiment, the second field of the second RRC message comprises all or partial field IEs in the second RRC message.

In one subembodiment of the above embodiment, the second field is a logicalChannelIdentity field.

In one subembodiment of the above embodiment, the second field is a servedRadioBearer field.

In one subembodiment of the above embodiment, the second field is a reestablishRLC field.

In one subembodiment of the above embodiment, the second field is an rlc-Config field.

In one subembodiment of the above embodiment, the second field is a mac-LogicalChannelConfig field.

In one subembodiment of the above embodiment, the second field is an rlc-Config-v1610 field.

In one subembodiment of the above embodiment, the second field is an associatedLogicalChannelIdentity field.

In one subembodiment of the above embodiment, the second field is an associatedServedRadioBearer field.

In one subembodiment of the above embodiment, the fourth field is a logicalChannelIdentity field.

In one subembodiment of the above embodiment, the fourth field is a servedRadioBearer field.

In one subembodiment of the above embodiment, the fourth field is a reestablishRLC field.

In one subembodiment of the above embodiment, the fourth field is an rlc-Config field.

In one subembodiment of the above embodiment, the fourth field is a mac-LogicalChannelConfig field.

In one subembodiment of the above embodiment, the fourth field is an rlc-Config-v1610 field.

In one subembodiment of the above embodiment, the fourth field is an associatedLogicalChannelIdentity field.

In one subembodiment of the above embodiment, the fourth field is an associatedServedRadioBearer field.

In one subembodiment of the above embodiment, the second field comprises at least one of a logicalChannelIdentity field, a servedRadioBearer field, a reestablishRLC field, an rlc-Config field, an fic-Config-v1610 field, a mac-LogicalChannelConfig field, an associatedLogicalChannelIdentity field or an associatedServedRadioBearer.

In one subembodiment of the above embodiment, the fourth field comprises at least one of a logicalChannelIdentity field, a servedRadioBearer field, a reestablishRLC field, an rlc-Config field, an fic-Config-v1610 field, a mac-LogicalChannelConfig field, an associatedLogicalChannelIdentity field or an associatedServedRadioBearer.

In one subembodiment of the above embodiment, a value of the second field comprises at least one of an srb-Identity, a drb-Identity or an mrb-Identity.

In one subembodiment of the above embodiment, a value of the fourth field comprises at least one of an srb-Identity, a drb-Identity or an mrb-Identity.

In one subembodiment of the above embodiment, a value of the second field comprises at least one of an associated-Srb-Identity, an associatedDrb-Identity or an associatedMrb-Identity.

In one subembodiment of the above embodiment, a value of the fourth field comprises at least one of an associatedSrb-Identity, an associatedDrb-Identity or an associatedMrb-Identity.

In one subembodiment of the above embodiment, the second field comprises all or partial fields in an IE.

In one subembodiment of the above embodiment, the fourth field comprises all or partial fields in an IE.

In one embodiment, the second RRC message is used for configuration of at least one of an RLC entity, an association with a PDCP entity and in a corresponding logical channel in MAC.

In one embodiment, the second RRC message is an rlc-BearerToAddModList field, and the second RRC message comprises one or a plurality of RLC-BearerConfig fields.

In one subembodiment of the above embodiment, the second field is an RLC-BearerConfig field, and the second field of the second RRC message is one of the one or a plurality of RLC-BearerConfig fields.

In one subembodiment of the above embodiment, the second field comprises all or partial fields in an IE.

In one subembodiment of the above embodiment, the fourth field comprises all or partial fields in an IE.

In one embodiment, a scheduling signaling of the first RRC message in an air interface is identified by a unicast RNTI.

In one embodiment, a scheduling signaling of the second RRC message in an air interface is identified by a non-unicast RNTI.

In one embodiment, a scheduling signaling of the first RRC message in an air interface is identified by a non-unicast RNTI.

In one embodiment, a scheduling signaling of the second RRC message in an air interface is identified by a unicast RNTI.

In one embodiment, the phrase of a scheduling signaling of the first RRC message in an air interface being identified by a non-unicast RNTI includes: determining whether a scheduling signaling of the first RRC message in an air interface exists according to the non-unicast RNTI.

In one embodiment, the phrase of a scheduling signaling of the first RRC message in an air interface being identified by a non-unicast RNTI includes: determining time-frequency resource occupied by a transmission of the first RRC message according to the non-unicast RNTI.

In one embodiment, the phrase of a scheduling signaling of the first RRC message in an air interface being identified by a non-unicast RNTI includes: the non-unicast RNTI is scrambled by a CRC of a scheduling signaling of the first RRC message in an air interface.

In one embodiment, the phrase of a scheduling signaling of the second RRC message in an air interface being identified by a non-unicast RNTI includes: determining whether a scheduling signaling of the second RRC message in an air interface exists according to the non-unicast RNTI.

In one embodiment, the phrase of a scheduling signaling of the second RRC message in an air interface being identified by a non-unicast RNTI includes: determining time-frequency resources occupied by a transmission of the second RRC message according to the non-unicast RNTI.

In one embodiment, the phrase of a scheduling signaling of the second RRC message in an air interface being identified by a non-unicast RNTI includes: the non-unicast RNTI is scrambled by a CRC of a scheduling signaling of the second RRC message in an air interface.

In one embodiment, the phrase of a scheduling signaling of the first RRC message in an air interface being identified by a unicast RNTI includes: determining whether a scheduling signaling of the first RRC message in an air interface exists according to the unicast RNTI.

In one embodiment, the phrase of a scheduling signaling of the first RRC message in an air interface being identified by a unicast RNTI includes: determining time-frequency resources occupied by a transmission of the first RRC message according to the unicast RNTI.

In one embodiment, the phrase of a scheduling signaling of the first RRC message in an air interface being identified by a unicast RNTI includes: the unicast RNTI is scrambled by a CRC of a scheduling signaling of the first RRC message in an air interface.

In one embodiment, the phrase of a scheduling signaling of the second RRC message in an air interface being identified by a unicast RNTI includes: determining whether a scheduling signaling of the second RRC message in an air interface exists according to the unicast RNTI.

In one embodiment, the phrase of a scheduling signaling of the second RRC message in an air interface being identified by a unicast RNTI includes: determining time-frequency resources occupied by a transmission of the second RRC message according to the unicast RNTI.

In one embodiment, the phrase of a scheduling signaling of the second RRC message in an air interface being identified by a unicast RNTI includes: the unicast RNTI is scrambled by a CRC of a scheduling signaling of the second RRC message in an air interface.

In one embodiment, the unicast RNTI comprises a Cell RNTI (C-RNTI).

In one embodiment, a number of bits comprised in the unicast RNTI is a positive integral multiple of 8.

In one embodiment, the unicast RNTI comprises 24 bits.

In one embodiment, the non-unicast RNTI comprises a Group RNTI (G-RNTI).

In one embodiment, the non-unicast RNTI comprises a Multicast/Broadcast RNTI (MBS-RNTI).

In one embodiment, a number of bits comprised in the non-unicast RNTI is a positive integral multiple of 8.

In one embodiment, the non-unicast RNTI comprises 24 bits.

In one embodiment, the behavior of determining whether the third field of the first RRC message is applied to the second field of the second RRC message according to the fourth field of the second RRC message includes: determining whether the third field of the first RRC message is applied to the second field of the second RRC message according to whether a value of the fourth field of the second RRC message is the same as a value of the first field of the first RRC message.

In one embodiment, the first RRC message comprises at least one fourth field; the behavior of determining whether the third field of the first RRC message is applied to the second field of the second RRC message according to the fourth field of the second RRC message includes: determining whether the third field of the first RRC message is applied to the second field of the second RRC message according to whether a value of the fourth field of the second RRC message is the same as a value of at least one the fourth field of the first RRC message.

In one embodiment, the behavior of determining whether the third field of the first RRC message is applied to the second field of the second RRC message according to the fourth field of the second RRC message includes: determining whether the third field of the first RRC message is applied to the second field of the second RRC message according to whether the fourth field of the first RRC message is not present.

In one embodiment, the behavior of determining whether the third field of the first RRC message is applied to the second field of the second RRC message according to the fourth field of the second RRC message includes: determining whether the third field of the first RRC message is applied to the second field of the second RRC message according to a value of the fourth field of the second RRC message.

In one embodiment, the behavior of applying the third field of the first RRC message to the second field of the second RRC message includes: taking a value of the third field of the first RRC message as a value of the second field of a second RRC message.

In one embodiment, the behavior of applying the third field of the first RRC message to the second field of the second RRC message includes: using a current value of the third field.

In one embodiment, the behavior of applying the third field of the first RRC message to the second field of the second RRC message includes: using a previously configured value of the third field.

In one embodiment, a current value of the third field is a value of the third field of the first RRC message.

In one embodiment, a previously configured value of the third field is a value of the third field of the first RRC message.

In one embodiment, the phrase of the fourth field and the first field being two different fields includes: the fourth field and the first field respectively correspond to different IEs.

In one embodiment, the phrase of the fourth field and the first field being two different fields includes: a value range of the fourth field is different from a name of the first field.

In one embodiment, the phrase of the fourth field and the first field being two different fields includes: a value range of the fourth field is different from a value range of the first field.

In one embodiment, a problem to be solved in the present disclosure includes: the problem of the bearer configuration of broadcast/multicast, especially the association between PTP branch and PTM branch.

In one embodiment, advantages of the above method include: the saved configuration parameters are reused as much as possible to reduce the signaling overhead.

In one embodiment, advantages of the above method include: the existing data structure is reused to the greatest extent to reduce the standard workload.

Embodiment 2

Figure 2:
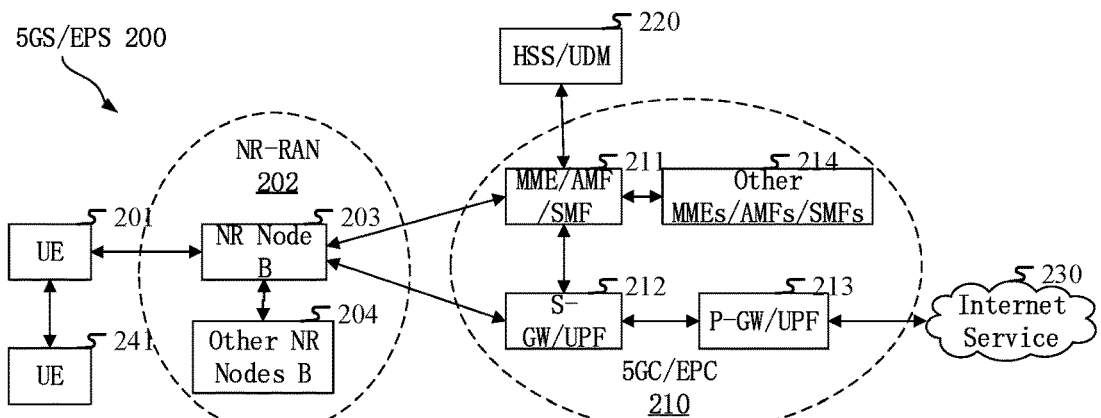
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2. FIG. 2 is a diagram illustrating a network architecture 200 of 5G NR, Long-Term Evolution (LIE) and Long-Term Evolution Advanced (LIE-A) systems. The 5G NR or LIE network architecture 200 may be called a 5G System (5GS)/Evolved Packet System (EPS) 200 or other appropriate terms. The 5GS/EPS 200 may comprise one or more UEs 201, an NG-RAN 202, a 5G Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present disclosure.

In one embodiment, the UE 201 supports communications within Non-Terrestrial Networks (NTNs).

In one embodiment, the UE 201 supports communications within networks with large delay differences.

In one embodiment, the UE 201 supports communications within Terrestrial Networks (TNs).

In one embodiment, the UE 201 is a UE.

In one embodiment, the UE 201 is an aircraft.

In one embodiment, the UE 201 is a vehicle terminal.

In one embodiment, the UE 201 is a relay.

In one embodiment, the UE 201 is a vessel.

In one embodiment, the UE 201 is a IoT terminal.

In one embodiment, the UE 201 is an Industrial IoT terminal.

In one embodiment, the UE 201 is a device that supports transmission with low-latency and high-reliability.

In one embodiment, the gNB 203 corresponds to the second node in the present disclosure.

In one embodiment, the gNB 203 comprises an MN.

In one embodiment, the gNB 203 comprises an SN.

In one embodiment, the gNB 203 comprises a Basestation (BS).

In one embodiment, the gNB 203 comprises a UE.

In one embodiment, the gNB 203 supports communications within NTNs.

In one embodiment, the gNB 203 supports communications within networks with large delay differences.

In one embodiment, the gNB 203 supports communications within TNs.

In one embodiment, the gNB 203 is a Marco Cellular base station.

In one embodiment, the gNB 203 is a Micro Cell base station.

In one embodiment, the gNB 203 is a Pico Cell base station.

In one embodiment, the gNB 203 is a Femtocell.

In one embodiment, the gNB 203 is a base station that supports large delay differences.

In one embodiment, the gNB 203 is a flight platform.

In one embodiment, the gNB 203 is satellite equipment.

In one embodiment, the gNB 203 is a UE.

In one embodiment, the gNB 203 is a gateway.

In one embodiment, the gNB 203 is a base station supporting NR.

In one embodiment, the gNB 203 is a base station supporting EUTRA.

In one embodiment, the gNB 203 is a base station supporting WLAN.

In one embodiment, the gNB 203 is a base station supporting BT.

Embodiment 3

Figure 3:
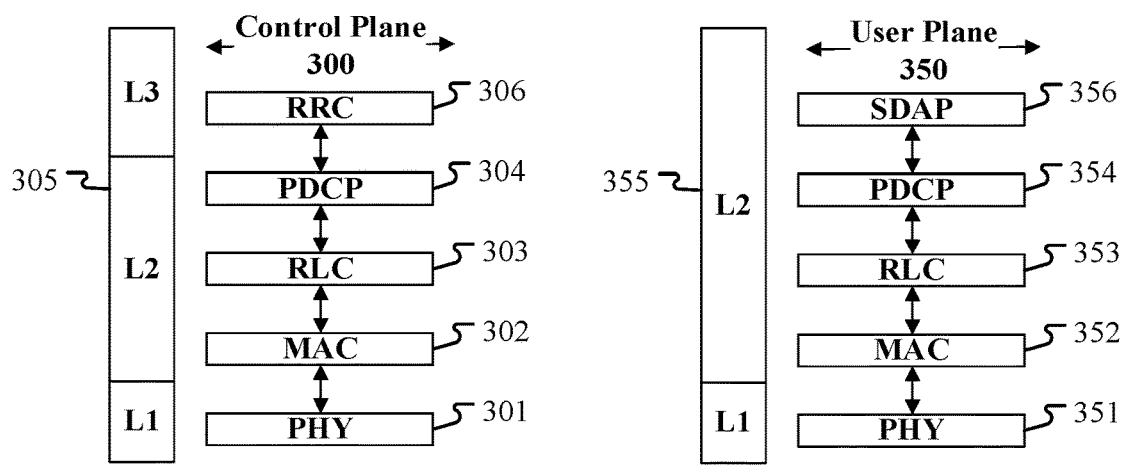
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for the control plane 300 is represented by three layers, which are a layer 1, a layer 2 and a layer 3, respectively. The layer 1 (L1) is the lowest layer and performs signal processing functions of various PHY layers. The L1 is called PHY 301 in the present disclosure. L2 305, above the PHY 301, comprises a Medium Access Control (MAC) sublayer 302, a Radio Link Control (RLC) sublayer 303 and a Packet Data Convergence Protocol (PDCP) sublayer 304. The PDCP sublayer 304 provides multiplexing among variable radio bearers and logical channels. The PDCP sublayer 304 provides security by encrypting a data packet and provides support for handover. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating various radio resources (i.e., resources block) in a cell. The MAC sublayer 302 is also in charge of HARQ operation. The RRC sublayer 306 in L3 layer of the control plane 300 is responsible for acquiring radio resources (i.e., radio bearer) and configuring the lower layer with an RRC signaling. The radio protocol architecture of the user plane 350 comprises layer 1 (L1) and layer 2 (L2). In the user plane 350, the radio protocol architecture is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first RRC message in the present disclosure is generated by the RRC 306.

In one embodiment, the second RRC message in the present disclosure is generated by the RRC 306.

In one embodiment, the third RRC message in the present disclosure is generated by the RRC 306.

Embodiment 4

Figure 4:
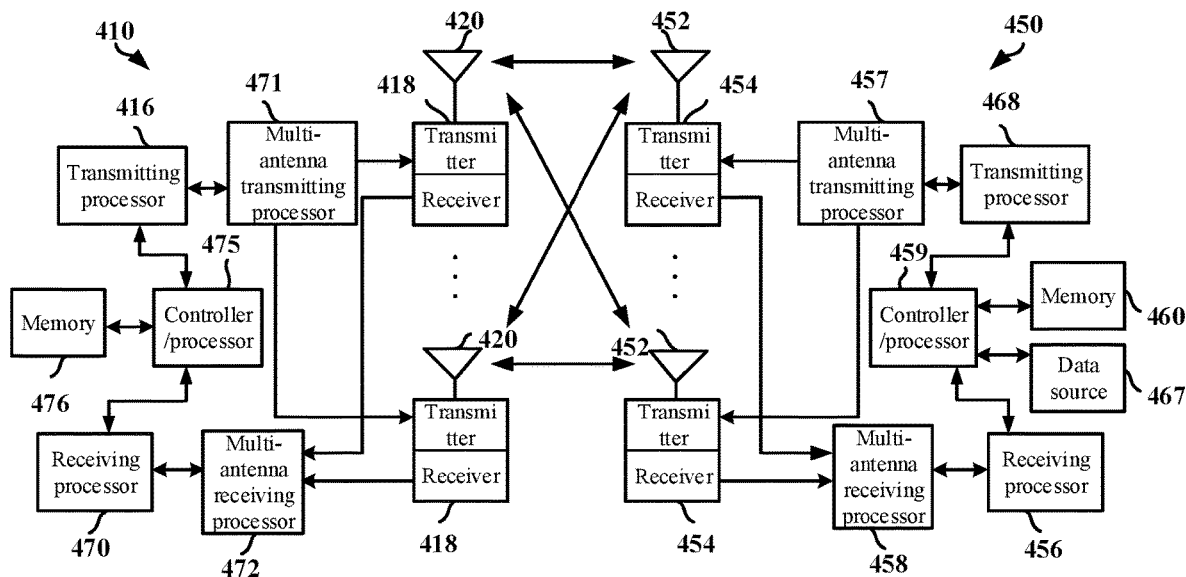
FIG. 4 illustrates a schematic diagram of a first communication device and a second communication device according to one embodiment of the present disclosure.

Embodiment 4 illustrates a schematic diagram of a first communication device and a second communication device in the present disclosure, as shown in FIG. 4. FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the first communication device 410, a higher layer packet from the core network is provided to a controller/processor 475. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410 side, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multi-carrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first communication device 450 comprises at least one processor and at least one memory, at least one processor and at least one memory. The at least one memory comprises computer program codes; the at least one memory and the computer program codes are configured to be used in collaboration with the at least one processor, the first communication device 450 at least: receives a first RRC message, the first RRC message comprises a first field, at least one second field and a third field; receives a second RRC message after receiving the first RRC message, the second RRC message comprises a second field and a fourth field; and determines whether the third field of the first RRC message is applied to the second field of the second RRC message according to the fourth field of the second RRC message; herein, the second field comprises a logical channel ID; the first RRC message is used to configure a cell group, and a cell group configured by the first RRC message is identified by the first field of the first RRC message; the fourth field and the first field are two different fields.

In one embodiment, the first communication device 450 comprises at least one processor and at least one memory, a memory that stores a computer readable instruction program. The computer readable instruction program generates an action when executed by at least one processor. The action includes: receiving a first RRC message, the first RRC message comprising a first field, at least one second field and a third field; receiving a second RRC message after receiving the first RRC message, the second RRC message comprising a second field and a fourth field; determining whether the third field of the first RRC message is applied to the second field of the second RRC message according to the fourth field of the second RRC message; herein, the second field comprises a logical channel ID; the first RRC message is used to configure a cell group, and a cell group configured by the first RRC message is identified by the first field of the first RRC message; the fourth field and the first field are two different fields.

In one embodiment, the second communication device 410 comprises at least one processor and at least one memory. The at least one memory comprises computer program codes; the at least one memory and the computer program codes are configured to be used in collaboration with the at least one processor. The second communication device 410 at least: transmits a first RRC message, the first RRC message comprises a first field, at least one second field and a third field; transmits a second RRC message after transmitting the first RRC message, the second RRC message comprises a second field and a fourth field; herein, the second field comprises a logical channel ID; the first RRC message is used to configure a cell group, and a cell group configured by the first RRC message is identified by the first field of the first RRC message; the fourth field of the second RRC message is used to determine whether the third field of the first RRC message is applied to the second field of the second RRC message; the fourth field and the first field are two different fields.

In one embodiment, the second communication device 410 comprises a memory that stores a computer readable instruction program. The computer readable instruction program generates an action when executed by at least one processor. The action includes: transmitting a first RRC message, the first RRC message comprising a first field, at least one second field and a third field; transmitting a second RRC message after transmitting the first RRC message, the second RRC message comprising a second field and a fourth field; herein, the second field comprises a logical channel ID; the first RRC message is used to configure a cell group, and a cell group configured by the first RRC message is identified by the first field of the first RRC message; the fourth field of the second RRC message is used to determine whether the third field of the first RRC message is applied to the second field of the second RRC message; the fourth field and the first field are two different fields.

In one embodiment, the antenna 452, the receiver 454, the receiving processor 456, and the controller/processor 459 are used to a first RRC message; at least one of the antenna 420, the transmitter 418, the transmitting processor 416, or the controller/processor 475 is used to transmit a first RRC message.

In one embodiment, the antenna 452, the transmitter 454, the transmitting processor 468, and the controller/processor 459 are used to transmit a first RRC message; at least one of the antenna 420, the receiver 418, the receiving processor 470, or the controller/processor 475 is used to receive a first RRC message.

In one embodiment, the antenna 452, the receiver 454, the receiving processor 456, and the controller/processor 459 are used to a second RRC message; at least one of the antenna 420, the transmitter 418, the transmitting processor 416, or the controller/processor 475 is used to transmit a second RRC message.

In one embodiment, the antenna 452, the transmitter 454, the transmitting processor 468, and the controller/processor 459 are used to transmit a second RRC message; at least one of the antenna 420, the receiver 418, the receiving processor 470, or the controller/processor 475 is used to receive a second RRC message.

In one embodiment, the antenna 452, the receiver 454, the receiving processor 456, and the controller/processor 459 are used to a third RRC message; at least one of the antenna 420, the transmitter 418, the transmitting processor 416, or the controller/processor 475 is used to transmit a third RRC message.

In one embodiment, the antenna 452, the transmitter 454, the transmitting processor 468, and the controller/processor 459 are used to transmit a third RRC message; at least one of the antenna 420, the receiver 418, the receiving processor 470, or the controller/processor 475 is used to receive a third RRC message.

In one embodiment, the first communication device 450 corresponds to the first node in the present disclosure.

In one embodiment, the second communication device 410 corresponds to the second node in the present disclosure.

In one embodiment, the first communication device 450 is a UE.

In one embodiment, the first communication device 450 is a UE that supports large delay differences.

In one embodiment, the first communication device 450 is a UE that supports NTNs.

In one embodiment, the first communication device 450 is an aircraft device.

In one embodiment, the first communication device 450 has positioning capability.

In one embodiment, the first communication device 450 does not have positioning capability.

In one embodiment, the first communication device 450 is a UE that supports TNs.

In one embodiment, the second communication device 410 is a base station (gNB/eNB/ng-eNB).

In one embodiment, the second communication device 410 is a base station that supports large delay differences.

In one embodiment, the second communication device 410 is a base station that supports NTNs.

In one embodiment, the second communication device 410 is a satellite equipment.

In one embodiment, the second communication device 410 is flying platform equipment.

In one embodiment, the second communication device 410 is a base station that supports TNs.

In one embodiment, the second communication device 410 is a UE.

Embodiment 5

Figure 5:
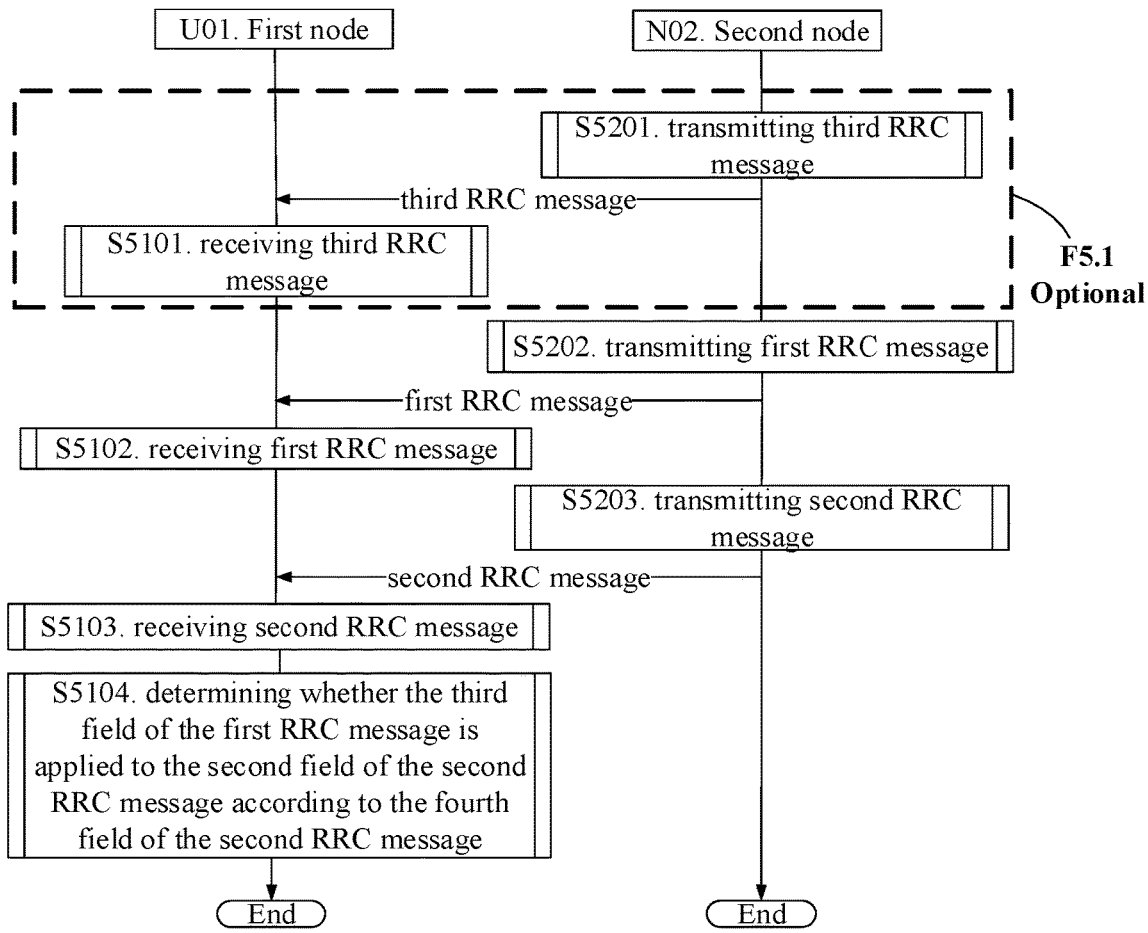
FIG. 5 illustrates a flowchart of radio signal transmission according to one embodiment of the present disclosure.

Embodiment 5 illustrates a flowchart of radio signal transmission according to one embodiment in the present disclosure, as shown in FIG. 5. It is particularly underlined that the order illustrated in the embodiment does not put constraints over sequences of signal transmissions and implementations.

The first node U01 receives a third RRC message in step S5101, the third RRC message comprises a first field, at least one second field, and a third field; receives a first RRC message in step S5102, the first RRC message comprises a first field, at least one second field and a third field; in step S5103, receives a second RRC message after receiving the first RRC message, the second RRC message comprises a second field and a fourth field; and in step S5104, determines whether the third field of the first RRC message is applied to the second field of the second RRC message according to the fourth field of the second RRC message;

the second node N02 transmits a third RRC message in step S5201; transmits a first RRC message in step S5202; in step S5203, transmits a second RRC message after transmitting the first RRC message;

in embodiment 5, the second field comprises a logical channel ID; the first RRC message is used to configure a cell group, and a cell group configured by the first RRC message is identified by the first field of the first RRC message; the fourth field and the first field are two different fields.

In one embodiment, the third RRC message is transmitted before transmitting the first RRC message.

In one embodiment, the first RRC message is transmitted before transmitting the second RRC message.

In one embodiment, the third RRC message is received before receiving the first RRC message.

In one embodiment, the first RRC message and the second RRC message correspond to a same IE.

In one embodiment, the first RRC message and the second RRC message correspond to different IEs.

In one embodiment, the first RRC message and the second RRC message correspond to a same field.

In one embodiment, the first RRC message and the second RRC message correspond to different fields.

In one embodiment, the third field is not present in the second RRC message.

In one embodiment, the behavior of applying the third field of the first RRC message to the second field of the second RRC message includes: using a current value of the third field.

In one embodiment, the behavior of applying the third field of the first RRC message to the second field of the second RRC message includes: using a previously configured value of the third field.

In one embodiment, a current value of the third field is a value of the third field of the first RRC message.

In one embodiment, a previously configured value of the third field is a value of the third field of the first RRC message.

In one embodiment, a receiving node of the first RRC message saves a value of the third field of the first RRC message.

In one embodiment, the behavior of using in the present disclosure includes: keeping.

In one embodiment, the behavior of using in the present disclosure includes: preserving.

In one embodiment, the behavior of using in the present disclosure includes: maintaining.

In one embodiment, the behavior of determining whether the third field of the first RRC message is applied to the second field of the second RRC message according to the fourth field of the second RRC message includes: if a value of the fourth field of the second RRC message is the same as a value of the first field of the first RRC message, the third field of the first RRC message is applied to the second field of the second RRC message; if a value of the fourth field of the second RRC message is different from a value of the first field of the first RRC message, the third field of the first RRC message is not applied to the second field of the second RRC message; the first field is not present in the second RRC message, or the fourth field is not present in the first RRC message.

In one embodiment, the first RRC message is a Cell-GroupConfig IE.

In one subembodiment of the above embodiment, the first field is a CellGroupId field.

In one embodiment, the second RRC message is a Cell-GroupConfig IE.

In one subembodiment of the above embodiment, the fourth field is an associatedCellGroupId field.

In one embodiment, the first RRC message is a Cell-GroupConfig IE, the first field is a CellGroupId field, the second field is an RLC-BearerConfig field, the second RRC message is a CellGroupConfig IE, and the second RRC message is a CellGroupConfig IE.

In one subembodiment of the above embodiment, the fourth field is an associatedCellGroupId field.

In one subembodiment of the above embodiment, the second RRC message is used to configure a cell group, and a cell group configured by the second RRC message is identified by the fourth field of the second RRC message.

In one subembodiment of the above embodiment, a value of the fourth field of the second RRC message being the same as a value of the first field of the first RRC message includes: a cell group configured by the first RRC message is the same as a cell group configured by the second RRC message.

In one subembodiment of the above embodiment, a value of the fourth field of the second RRC message being different from a value of the first field of the first RRC message includes: a cell group configured by the first RRC message is different from a cell group configured by the second RRC message.

In one subembodiment of the above embodiment, the third field is a mac-CellGroupConfig field; the behavior of applying the third field of the first RRC message to the second field of the second RRC message includes: a cell group configured by the second RRC message uses a MAC parameter configured by the third field of the first RRC message.

In one subembodiment of the above embodiment, the third field is a mac-CellGroupConfig field; the behavior of applying the third field of the first RRC message to the second field of the second RRC message includes: a cell group configured by the second RRC message uses a MAC entity configured by the third field of the first RRC message.

In one subembodiment of the above embodiment, the third field is a physicalCellGroupConfig field; the behavior of applying the third field of the first RRC message to the second field of the second RRC message includes: a cell group configured by the second RRC message uses an L1 parameter configured by the third field of the first RRC message.

In one subembodiment of the above embodiment, the third field is a physicalCellGroupConfig field; the behavior of applying the third field of the first RRC message to the second field of the second RRC message includes: a cell group configured by the second RRC message uses a physical layer parameter configured by the third field of the first RRC message.

In one subembodiment of the above embodiment, the third field is a physicalCellGroupConfig field; the behavior of applying the third field of the first RRC message to the second field of the second RRC message includes: a cell group configured by the second RRC message uses a physical layer configured by the third field of the first RRC message.

In one subembodiment of the above embodiment, the third field is a spCellConfig field; the behavior of applying the third field of the first RRC message to the second field of the second RRC message includes: a cell group configured by the second RRC message uses a special cell parameter configured by the third field of the first RRC message.

In one subembodiment of the above embodiment, the third field is a spCellConfig field; the behavior of applying the third field of the first RRC message to the second field of the second RRC message includes: a cell group configured by the second RRC message uses a special cell configured by the third field of the first RRC message.

In one subembodiment of the above embodiment, the third field is a sCellToAddModList field; the behavior of applying the third field of the first RRC message to the second field of the second RRC message includes: a cell group configured by the second RRC message uses a secondary cell parameter configured by the third field of the first RRC message.

In one subembodiment of the above embodiment, the third field is a sCellToAddModList field; the behavior of applying the third field of the first RRC message to the second field of the second RRC message includes: a cell group configured by the second RRC message uses a secondary cell configured by the third field of the first RRC message.

In one subembodiment of the above embodiment, the behavior of applying the third field of the first RRC message to the second field of the second RRC message includes: not applying the third field of the first RRC message to a cell group configured by the second RRC message.

In one subembodiment of the above embodiment, an RLC entity configured by the second field of the second RRC message belongs to a cell group identified by the fourth field of the second RRC message.

In one subembodiment of the above embodiment, an RLC entity configured by the second field of the second RRC message belongs to a cell group configured by the second RRC message.

In one subembodiment of the above embodiment, a logical channel configured by the second field of the first RRC message and a logical channel configured by the second field of the second RRC message are associated with a same higher layer entity.

In one subsidiary embodiment of the above subembodiment, the higher layer entity is an RLC entity.

In one subsidiary embodiment of the above subembodiment, the higher layer entity is a PDCP entity.

In one embodiment, the behavior of processing in the present disclosure includes: sending.

In one embodiment, the behavior of processing in the present disclosure includes: transmitting.

In one embodiment, the behavior of processing in the present disclosure includes: receiving.

In one embodiment, the behavior of processing in the present disclosure includes: transferring.

In one embodiment, the first RRC message comprises at least one fourth field; the behavior of determining whether the third field of the first RRC message is applied to the second field of the second RRC message according to the fourth field of the second RRC message includes: if a value of the fourth field of the second RRC message is the same as a value of at least one the fourth field of the first RRC message, the third field of the first RRC message is applied to the second field of the second RRC message; if a value of the fourth field of the second RRC message is different from a value of any the fourth field of the first RRC message, the third field of the first RRC message is not applied to the second field of the second RRC message.

In one embodiment, the first RRC message comprises M fourth fields, the one fourth field is one of the M fourth fields, M being a positive integer greater than 1.

In one subembodiment of the above embodiment, M is greater than K.

In one subembodiment of the above embodiment, M is equal to K.

In one subembodiment of the above embodiment, M is equal to 32.

In one subembodiment of the above embodiment, M is not greater than 10000.

In one embodiment, the first RRC message comprises a plurality of fourth fields, and the one fourth field is one of the plurality of fourth fields.

In one embodiment, any the fourth field in the first RRC message belongs to a said second field of the first RRC message.

In one embodiment, the fourth field of the second RRC message belongs to the second field of the second RRC message.

In one embodiment, the first RRC message is a CellGroupConfig IE, the second field is an RLC-BearerConfig field, and the fourth field is a servedRadioBearer field; the second RRC message is an RLC-BearerConfig field.

In one subembodiment of the above embodiment, a radio bearer served by an RLC entity configured by the second field of the second RRC message is identified by the fourth field of the second RRC message.

In one subembodiment of the above embodiment, a radio bearer served by an RLC entity configured by the second RRC message is identified by the fourth field of the second RRC message.

In one subembodiment of the above embodiment, a value of the fourth field of the second RRC message being the same as a value of at least one the fourth field of the first RRC message includes: a radio bearer identified by at least one the fourth field of the first RRC message is the same as a radio bearer identified by the fourth field of the second RRC message; a cell group to which an RLC entity configured by the second RRC message belongs is a cell group configured by the first RRC message.

In one subembodiment of the above embodiment, a value of the fourth field of the second RRC message being the same as a value of at least one the fourth field of the first RRC message includes: a radio bearer identified by at least one the fourth field of the first RRC message is the same as a radio bearer identified by the fourth field of the second RRC message.

In one subembodiment of the above embodiment, a value of the fourth field of the second RRC message being the same as a value of at least one the fourth field of the first RRC message includes: an RLC bearer configured by a second field to which at least one the fourth field of the first RRC message belongs and an RLC bearer configured by the second RRC message are associated with a same PDCP entity.

In one subembodiment of the above embodiment, a value of the fourth field of the second RRC message being the same as a value of at least one the fourth field of the first RRC message includes: an RLC entity configured by a second field to which at least one the fourth field of the first RRC message belongs and an RLC entity configured by the second RRC message are associated with a same PDCP entity.

In one subembodiment of the above embodiment, a value of the fourth field of the second RRC message being the same as a value of at least one the fourth field of the first RRC message includes: a logical channel configured by a second field to which at least one the fourth field of the first RRC message belongs and a logical channel configured by the second RRC message are associated with a same PDCP entity.

In one subsidiary embodiment of the above subembodiment, the higher layer entity is an RLC entity.

In one subsidiary embodiment of the above subembodiment, the higher layer entity is a PDCP entity.

In one subembodiment of the above embodiment, a value of the fourth field of the second RRC message being different from a value of any the fourth field of the first RRC message includes: a radio bearer identified by any fourth field of the first RRC message is different from a radio bearer identified by the fourth field of the second RRC message; a cell group to which an RLC entity configured by the second RRC message belongs is different from a cell group configured by the first RRC message.

In one subembodiment of the above embodiment, a value of the fourth field of the second RRC message being different from a value of any the fourth field of the first RRC message includes: a cell group to which an RLC entity configured by the second RRC message belongs is different from a cell group configured by the first RRC message.

In one subembodiment of the above embodiment, a value of the fourth field of the second RRC message being different from a value of any the fourth field of the first RRC message includes: a radio bearer identified by any fourth field of the first RRC message is different from a radio bearer identified by the fourth field of the second RRC message.

In one subembodiment of the above embodiment, a value of the fourth field of the second RRC message being different from a value of any the fourth field of the first RRC message includes: an RLC bearer configured by a second field to which any fourth field of the first RRC message belongs and an RLC bearer configured by the second RRC message are respectively associated with different PDCP entities.

In one subembodiment of the above embodiment, a value of the fourth field of the second RRC message being different from a value of any the fourth field of the first RRC message includes: an RLC entity configured by a second field to which any fourth field of the first RRC message belongs and an RLC entity configured by the second RRC message are respectively associated with different PDCP entities.

In one subembodiment of the above embodiment, the third field is a mac-CellGroupConfig field; the behavior of applying the third field of the first RRC message to the second field of the second RRC message includes: a cell group to which an RLC entity configured by the second RRC message belongs uses a MAC parameter configured by the third field of the first RRC message.

In one subembodiment of the above embodiment, the third field is a mac-CellGroupConfig field; the behavior of applying the third field of the first RRC message to the second field of the second RRC message includes: a cell group to which an RLC entity configured by the second RRC message belongs uses a MAC entity configured by the third field of the first RRC message.

In one subembodiment of the above embodiment, the third field is a physicalCellGroupConfig field; the behavior of applying the third field of the first RRC message to the second field of the second RRC message includes: a cell group to which an RLC entity configured by the second RRC message belongs uses an L1 parameter configured by the third field of the first RRC message.

In one subembodiment of the above embodiment, the third field is a physicalCellGroupConfig field; the behavior of applying the third field of the first RRC message to the second field of the second RRC message includes: a cell group to which an RLC entity configured by the second RRC message belongs uses a physical layer parameter configured by the third field of the first RRC message.

In one subembodiment of the above embodiment, the third field is a physicalCellGroupConfig field; the behavior of applying the third field of the first RRC message to the second field of the second RRC message includes: a cell group to which an RLC entity configured by the second RRC message belongs uses a physical layer configured by the third field of the first RRC message.

In one subembodiment of the above embodiment, the third field is a spCellConfig field; the behavior of applying the third field of the first RRC message to the second field of the second RRC message includes: a cell group to which an RLC entity configured by the second RRC message belongs uses a special cell parameter configured by the third field of the first RRC message.

In one subembodiment of the above embodiment, the third field is a spCellConfig field; the behavior of applying the third field of the first RRC message to the second field of the second RRC message includes: a cell group to which an RLC entity configured by the second RRC message belongs uses a special cell configured by the third field of the first RRC message.

In one subembodiment of the above embodiment, the third field is a sCellToAddModList field; the behavior of applying the third field of the first RRC message to the second field of the second RRC message includes: a cell group to which an RLC entity configured by the second RRC message belongs uses a secondary cell parameter configured by the third field of the first RRC message.

In one subembodiment of the above embodiment, the third field is a sCellToAddModList field; the behavior of applying the third field of the first RRC message to the second field of the second RRC message includes: a cell group to which an RLC entity configured by the second RRC message belongs uses a secondary cell configured by the third field of the first RRC message.

In one subembodiment of the above embodiment, the behavior of not applying the third field of the first RRC message to the second field of the second RRC message includes: not applying the third field of the first RRC message to a cell group to which an RLC entity configured by the second RRC message belongs.

In one embodiment, the first RRC message comprises at least one fifth field; the behavior of determining whether the third field of the first RRC message is applied to the second field of the second RRC message according to the fourth field of the second RRC message includes: if a value of the fourth field of the second RRC message is the same as a value of at least one the fifth field of the first RRC message, the third field of the first RRC message is applied to the second field of the second RRC message; if a value of the fourth field of the second RRC message is different from a value of any the fifth field of the first RRC message, the third field of the first RRC message is not applied to the second field of the second RRC message.

In one embodiment, the first RRC message comprises N fourth fields, the one fourth field is one of the N fourth fields, N being a positive integer greater than 1.

In one subembodiment of the above embodiment, N is greater than K.

In one subembodiment of the above embodiment, N is equal to K.

In one subembodiment of the above embodiment, N is equal to 32.

In one subembodiment of the above embodiment, N is not greater than 10000.

In one subembodiment of the above embodiment, the first RRC message comprises a plurality of fifth fields, and the one fifth field is one of the plurality of fifth fields.

In one embodiment, any the fifth field in the first RRC message belongs to a said second field of the first RRC message.

In one embodiment, the third field in the first RRC message belongs to a said second field of the first RRC message.

In one embodiment, the fourth field of the second RRC message belongs to the second field of the second RRC message.

In one embodiment, the second RRC message comprises the fifth field.

In one embodiment, the fifth field of the second RRC message belongs to the second field of the second RRC message.

In one embodiment, the second RRC message is an RLC-BearerConfig field.

In one subembodiment of the above embodiment, the fifth field in the second RRC message is not present.

In one subembodiment of the above embodiment, the fifth field in the second RRC message exists.

In one subembodiment of the above embodiment, the third field is a logicalChannelIdentity field.

In one subembodiment of the above embodiment, the third field is a servedRadioBearer field.

In one subembodiment of the above embodiment, the third field is a reestablishRLC field.

In one subembodiment of the above embodiment, the third field is an rlc-Config field.

In one subembodiment of the above embodiment, the third field is a mac-LogicalChannelConfig field.

In one subembodiment of the above embodiment, the third field is an rlc-Config-v1610 field.

In one subembodiment of the above embodiment, the third field is an associatedLogicalChannelIdentity field.

In one subembodiment of the above embodiment, the third field is an associatedServedRadioBearer field.

In one subembodiment of the above embodiment, the third field comprises at least one of a logicalChannelIdentity field, a servedRadioBearer field, a reestablishRLC field, an rlc-Config field, an rlc-Config-v1610 field, a mac-LogicalChannelConfig field, an associatedLogicalChannelIdentity field or an associatedServedRadioBearer.

In one subsidiary embodiment of the above subembodiment, a value of the fourth field of the second RRC message is the same as a value of the fifth field of the second RRC message.

In one subsidiary embodiment of the above subembodiment, a value of the fourth field of the second RRC message is different from a value of the fifth field of the second RRC message.

In one subembodiment of the above embodiment, a value range of the fourth field is the same as a value range of the fifth field.

In one subembodiment of the above embodiment, a value range of the fourth field is different from a value range of the fifth field.

In one subembodiment of the above embodiment, the fourth field is an associatedLogicalChannelIdentity field.

In one subembodiment of the above embodiment, a logical channel identified by the fourth field of the second RRC message and a logical channel configured by the second RRC message are associated with a same RLC entity.

In one subembodiment of the above embodiment, a logical channel configured by the second RRC message is identified by the fifth field of the second RRC message.

In one embodiment, the first RRC message is a Cell-GroupConfig IE, the second field is an RLC-BearerConfig field, and the fifth field is a logicalChannelIdentity field.

In one subembodiment of the above embodiment, the second RRC message is an RLC-BearerConfig field.

In one subembodiment of the above embodiment, the second RRC message is an associatedRLC-BearerConfig field.

In one subembodiment of the above embodiment, the fourth field is an associatedLogicalChannelIdentity field.

In one subembodiment of the above embodiment, an RLC entity configured by the second RRC message is identified by the fourth field in the second RRC message.

In one subembodiment of the above embodiment, the second RRC message is used to configure a logical channel.

In one subembodiment of the above embodiment, a logical channel configured by the second RRC message is identified by the fourth field in the second RRC message.

In one subembodiment of the above embodiment, a logical channel configured by the second RRC message is identified by the fifth field in the second RRC message.

In one subembodiment of the above embodiment, a value of the fourth field of the second RRC message being the same as a value of at least one the fifth field of the first RRC message includes: a cell group to which an RLC entity configured by the second RRC message belongs is a cell group configured by the first RRC message.

In one subembodiment of the above embodiment, a value of the fourth field of the second RRC message being the same as a value of at least one the fifth field of the first RRC message includes: a logical channel configured by a second field to which at least one the fifth field of the first RRC message belongs and a logical channel configured by the second RRC message are associated with a same RLC entity; a cell group to which an RLC entity configured by the second RRC message belongs is a cell group configured by the first RRC message.

In one subembodiment of the above embodiment, a value of the fourth field of the second RRC message being the same as a value of at least one the fifth field of the first RRC message includes: a logical channel configured by a second field to which at least one the fifth field of the first RRC message belongs and a logical channel configured by the second RRC message are associated with a higher layer entity.

In one subsidiary embodiment of the above subembodiment, the higher layer entity is an RLC entity.

In one subsidiary embodiment of the above subembodiment, the higher layer entity is a PDCP entity.

In one subembodiment of the above embodiment, a value of the fourth field of the second RRC message being the same as a value of at least one the fifth field of the first RRC message includes: an RLC bearer identified by at least one the fifth field of the first RRC message is the same as an RLC bearer identified by the fourth field of the second RRC message.

In one subembodiment of the above embodiment, a value of the fourth field of the second RRC message being different from a value of any the fifth field of the first RRC message includes: a cell group to which an RLC entity configured by the second RRC message belongs is different from a cell group configured by the first RRC message.

In one subembodiment of the above embodiment, a value of the fourth field of the second RRC message being different from a value of any the fifth field of the first RRC message includes: a logical channel configured by a second field to which any the fifth field of the first RRC message belongs and a logical channel configured by the second RRC message are associated with different RLC entities; a cell group to which an RLC entity configured by the second RRC message belongs is different from a cell group configured by the first RRC message.

In one subembodiment of the above embodiment, a value of the fourth field of the second RRC message being different from a value of any the fifth field of the first RRC message includes: a logical channel configured by a second field to which any the fifth field of the first RRC message belongs and a logical channel configured by the second RRC message are associated with different RLC entities.

In one subembodiment of the above embodiment, a value of the fourth field of the second RRC message being different from a value of any the fifth field of the first RRC message includes: an RLC bearer identified by any the fifth field of the first RRC message is different from an RLC bearer identified by the fourth field of the second RRC message.

In one subembodiment of the above embodiment, the phrase of an RLC entity configured by the second RRC message includes a logical channel configured by the second RRC message.

In one subembodiment of the above embodiment, the phrase of an RLC entity configured by the second RRC message includes: a logical channel of an RLC entity configured by the second RRC message in MAC.

In one subembodiment of the above embodiment, the phrase of an RLC entity configured by the second RRC message includes: a PDCP entity configured by the second RRC message.

In one subembodiment of the above embodiment, the phrase of an RLC entity configured by the second RRC message includes: a radio bearer configured by the second RRC message.

In one subembodiment of the above embodiment, the phrase of an RLC entity configured by the second RRC message includes: a radio bearer served by an RLC entity configured by the second RRC message.

In one subembodiment of the above embodiment, the third field is an rlc-Config field; the behavior of applying the third field of the first RRC message to the second field of the second RRC message includes: an RLC entity configured by the second RRC message uses an RLC mode configured by the third field of the first RRC message.

In one subembodiment of the above embodiment, the third field is a mac-LogicalChannelConfig field; the behavior of applying the third field of the first RRC message to the second field of the second RRC message includes: an RLC entity configured by the second RRC message uses a logical channel parameter configured by the third field of the first RRC message.

In one subembodiment of the above embodiment, the third field is a reestablishRLC field; the behavior of applying the third field of the first RRC message to the second field of the second RRC message includes: an RLC entity configured by the second RRC message uses a value of the third field of the first RRC message.

In one subembodiment of the above embodiment, the third field of the first RRC message belongs to a second field in the first RRC message, and a value of the fifth field of a second field in the first RRC message is the same as a value of the fourth field of the second RRC message.

In one subembodiment of the above embodiment, the third field is a mac-CellGroupConfig field; the behavior of applying the third field of the first RRC message to the second field of the second RRC message includes: a cell group to which an RLC entity configured by the second RRC message belongs uses a MAC parameter configured by the third field of the first RRC message.

In one subembodiment of the above embodiment, the third field is a mac-CellGroupConfig field; the behavior of applying the third field of the first RRC message to the second field of the second RRC message includes: a cell group to which an RLC entity configured by the second RRC message belongs uses a MAC entity configured by the third field of the first RRC message.

In one subembodiment of the above embodiment, the third field is a physicalCellGroupConfig field; the behavior of applying the third field of the first RRC message to the second field of the second RRC message includes: a cell group to which an RLC entity configured by the second RRC message belongs uses an L1 parameter configured by the third field of the first RRC message.

In one subembodiment of the above embodiment, the third field is a physicalCellGroupConfig field; the behavior of applying the third field of the first RRC message to the second field of the second RRC message includes: a cell group to which an RLC entity configured by the second RRC message belongs uses a physical layer parameter configured by the third field of the first RRC message.

In one subembodiment of the above embodiment, the third field is a physicalCellGroupConfig field; the behavior of applying the third field of the first RRC message to the second field of the second RRC message includes: a cell group to which an RLC entity configured by the second RRC message belongs uses a physical layer configured by the third field of the first RRC message.

In one subembodiment of the above embodiment, the third field is a spCellConfig field; the behavior of applying the third field of the first RRC message to the second field of the second RRC message includes: a cell group to which an RLC entity configured by the second RRC message belongs uses a special cell parameter configured by the third field of the first RRC message.

In one subembodiment of the above embodiment, the third field is a spCellConfig field; the behavior of applying the third field of the first RRC message to the second field of the second RRC message includes: a cell group to which an RLC entity configured by the second RRC message belongs uses a special cell configured by the third field of the first RRC message.

In one subembodiment of the above embodiment, the third field is a sCellToAddModList field; the behavior of applying the third field of the first RRC message to the second field of the second RRC message includes: a cell group to which an RLC entity configured by the second RRC message belongs uses a secondary cell parameter configured by the third field of the first RRC message.

In one subembodiment of the above embodiment, the third field is a sCellToAddModList field; the behavior of applying the third field of the first RRC message to the second field of the second RRC message includes: a cell group to which an RLC entity configured by the second RRC message belongs uses a secondary cell configured by the third field of the first RRC message.

In one subembodiment of the above embodiment, the behavior of not applying the third field of the first RRC message to the second field of the second RRC message includes: not apply the third field of the first RRC message to a cell group to which an RLC entity configured by the second RRC message belongs.

In one subembodiment of the above embodiment, the behavior of not applying the third field of the first RRC message to the second field of the second RRC message includes: not applying the third field of the first RRC message to an RLC entity configured by the second RRC message.

In one embodiment, the behavior of not applying the third field of the first RRC message to the second field of the second RRC message includes: applying a value of the second field of the second RRC message.

In one embodiment, the behavior of not applying the third field of the first RRC message to the second field of the second RRC message includes: not applying a value of the third field of the first RRC message.

In one embodiment, the behavior of not applying the third field of the first RRC message to the second field of the second RRC message includes: applying the third field of the third RRC message to the second field of the second RRC message.

In one embodiment, the behavior of applying the third field of the third RRC message to the second field of the second RRC message includes: using a current value of the third field.

In one embodiment, the behavior of applying the third field of the third RRC message to the second field of the second RRC message includes: using a previously configured value of the third field.

In one embodiment, the behavior of applying the third field of the third RRC message to the second field of the second RRC message includes: a value of the third field of a third RRC message.

In one embodiment, a current value of the third field is a value of the third field of the third RRC message.

In one embodiment, a previously configured value of the third field is a value of the third field of the third RRC message.

In one embodiment, a receiving node of the third RRC message saves a value of the third field of the third RRC message.

In one embodiment, the third RRC message is used to configure a cell group, and a cell group configured by the third RRC message is identified by the first field of the third RRC message.

In one embodiment, the third RRC message comprises K1 second fields, the one second field is one of the K1 second fields, K1 being a positive integer greater than 1.

In one subembodiment of the above embodiment, K1 is equal to 32.

In one subembodiment of the above embodiment, K1 is not greater than 10000.

In one subembodiment of the above embodiment, the third RRC message comprises a plurality of second fields, and the one second field is one of the plurality of second fields.

In one embodiment, the third RRC message comprises at least one fourth field.

In one subembodiment of the above embodiment, any fourth field in the third RRC message belongs to a second field of the third RRC message.

In one embodiment, the third RRC message comprises M1 fourth fields, the one fourth field is one of the M1 fourth fields, M1 being a positive integer greater than 1.

In one subembodiment of the above embodiment, M1 is greater than K1.

In one subembodiment of the above embodiment, M1 is equal to K1.

In one subembodiment of the above embodiment, M1 is equal to 32.

In one subembodiment of the above embodiment, M1 is not greater than 10000.

In one embodiment, the third RRC message comprises a plurality of fourth fields, and the one fourth field is one of the plurality of fourth fields.

In one embodiment, a value of the fourth field of the second RRC message is the same as a value of the first field of the third RRC message.

In one embodiment, a value of the fourth field of the second RRC message is the same as a value of at least one the fourth field of the third RRC message.

In one embodiment, the third RRC message is a CellGroupConfig IE, the first field is a CellGroupId field, and the second field is an RLC-BearerConfig field.

In one subembodiment of the above embodiment, a comment text tag of the third field is Need M.

In one subembodiment of the above embodiment, a comment text tag of the third field is Need N.

In one subembodiment of the above embodiment, a comment text tag of the third field is Need R.

In one subembodiment of the above embodiment, a comment text tag of the third field is mac-CellGroupConfig.

In one embodiment, a scheduling signaling of the third RRC message in an air interface is identified by a non-unicast RNTI.

In one embodiment, a scheduling signaling of the third RRC message in an air interface is identified by a unicast RNTI.

In one embodiment, the phrase of a scheduling signaling of the third RRC message in an air interface being identified by a non-unicast RNTI includes: determining whether a scheduling signaling of the third RRC message in an air interface exists according to the non-unicast RNTI.

In one embodiment, the phrase of a scheduling signaling of the third RRC message in an air interface being identified by a non-unicast RNTI includes: determining time-frequency resources occupied by a transmission of the third RRC message according to the non-unicast RNTI.

In one embodiment, the phrase of a scheduling signaling of the third RRC message in an air interface being identified by a non-unicast RNTI includes: the non-unicast RNTI is scrambled by a CRC of a scheduling signaling of the third RRC message in an air interface.

In one embodiment, the phrase of a scheduling signaling of the third RRC message in an air interface being identified by a unicast RNTI includes: determining whether a scheduling signaling of the third RRC message in an air interface exists according to the unicast RNTI.

In one embodiment, the phrase of a scheduling signaling of the third RRC message in an air interface being identified by a unicast RNTI includes: determining time-frequency resources occupied by a transmission of the third RRC message according to the unicast RNTI.

In one embodiment, the phrase of a scheduling signaling of the third RRC message in an air interface being identified by a unicast RNTI includes: the unicast RNTI is scrambled by a CRC of a scheduling signaling of the third RRC message in an air interface.

In one embodiment, the dotted box F5.1 is optional.

In one subembodiment of the above embodiment, the dotted box F5.1 exists.

In one subembodiment of the above embodiment, the dotted box F5.1 does not exist.

Embodiment 6

Figure 6:
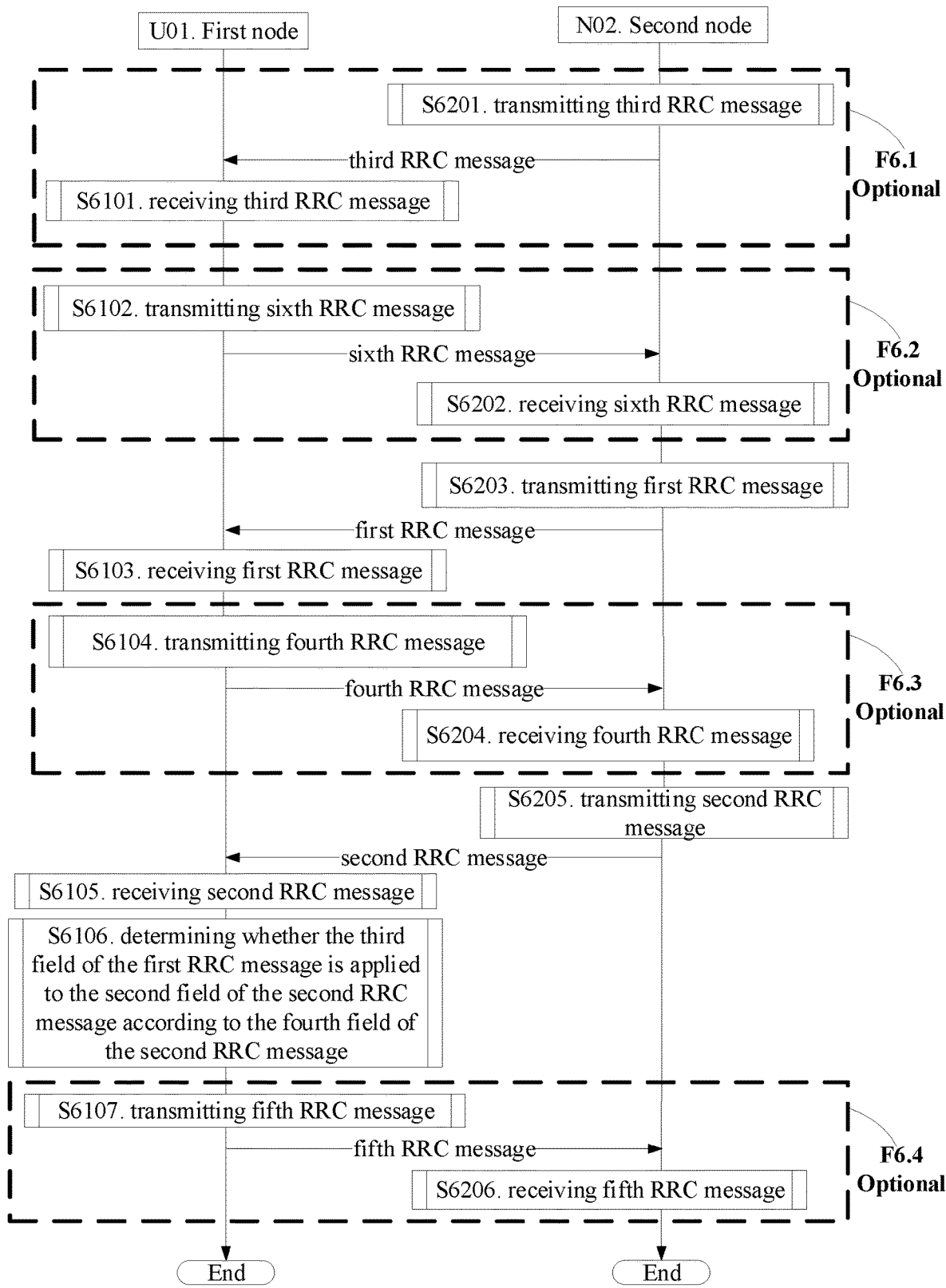
FIG. 6 illustrates a flowchart of radio signal transmission according to another embodiment of the present disclosure.

Embodiment 6 illustrates a flowchart of radio signal transmission according to another embodiment in the present disclosure, as shown in FIG. 6. It is particularly underlined that the order illustrated in the embodiment does not put constraints over sequences of signal transmissions and implementations.

The first node U01 receives a third RRC message in step S6101, the third RRC message comprises a first field, at least one second field, and a third field; transmits a sixth RRC message in step S6102; receives a first RRC message in step S6103, the first RRC message comprises a first field, at least one second field and a third field; transmits a fourth RRC message in step S6104; in step S6105, receives a second RRC message after receiving the first RRC message, the second RRC message comprises a second field and a fourth field; and in step S6106, determines whether the third field of the first RRC message is applied to the second field of the second RRC message according to the fourth field of the second RRC message; and transmits a fifth RRC message in step S6107;

the second node N02 transmits a third RRC message in step S6201; receives a sixth RRC message in step S6202; transmits a first RRC message in step S6203; receives a fourth RRC message in step S6204; in step S6205, transmits a second RRC message after transmitting the first RRC message; and receives a fifth RRC message in step S6206;

in embodiment 6, the second field comprises a logical channel ID; the first RRC message is used to configure a cell group, and a cell group configured by the first RRC message is identified by the first field of the first RRC message; the fourth field and the first field are two different fields.

In one embodiment, the fourth RRC message is used to confirm a successful completion of the first RRC message.

In one embodiment, as a response to receiving the first RRC message, the fourth RRC message is transmitted.

In one embodiment, the fourth RRC message indicates a successful completion of the first RRC message.

In one embodiment, the fourth RRC message comprises all or part of an RRCReconfigurationComplete message.

In one embodiment, the fourth message comprises all or part of an RRCConnectionReconfigurationComplete message.

In one embodiment, the fourth RRC message comprises an RRC message.

In one embodiment, the fourth RRC message comprises all or partial IEs in an RRC message.

In one embodiment, the fourth RRC message comprises all or partial fields in an IE in an RRC Message.

In one embodiment, the fifth RRC message is used to confirm a successful completion of the second RRC message.

In one embodiment, as a response to receiving the second RRC message, the fifth RRC message is transmitted.

In one embodiment, the fifth RRC message comprises all or part of an RRCReconfigurationComplete message.

In one embodiment, the fifth message comprises all or part of an RRCConnectionReconfigurationComplete message.

In one embodiment, the fifth RRC message comprises an RRC message.

In one embodiment, the fifth RRC message comprises all or partial IEs in an RRC message.

In one embodiment, the fifth RRC message comprises all or partial fields of an IE in an RRC Message.

In one embodiment, the sixth RRC message is used to confirm a successful completion of the third RRC message.

In one embodiment, as a response to receiving the third RRC message, the sixth RRC message is transmitted.

In one embodiment, the sixth RRC message comprises all or part of an RRCReconfigurationComplete message.

In one embodiment, the sixth message comprises all or part of an RRCConnectionReconfigurationComplete message.

In one embodiment, the sixth RRC message comprises an RRC message.

In one embodiment, the sixth RRC message comprises all or partial IEs in an RRC message.

In one embodiment, the sixth RRC message comprises all or partial fields in an IE in an RRC Message.

In one embodiment, the phrase of successful completion in the present disclosure includes: being successfully executed.

In one embodiment, the phrase of successful completion in the present disclosure includes: being successfully configured.

In one embodiment, the phrase of successful completion in the present disclosure includes: configuration being completed.

In one embodiment, the dotted box F6.1 is optional.

In one subembodiment of the above embodiment, the dotted box F6.1 exists.

In one subembodiment of the above embodiment, the dotted box F6.1 does not exist.

In one embodiment, the dotted box F6.2 is optional.

In one subembodiment of the above embodiment, the dotted box F6.2 exists.

In one subembodiment of the above embodiment, the dotted box F6.2 does not exist.

In one subembodiment of the embodiment, when the dotted box F6.1 does not exist, the dotted box F6.2 does not exist.

In one embodiment, the dotted box F6.3 is optional.

In one subembodiment of the above embodiment, the dotted box F6.3 exists.

In one subembodiment of the above embodiment, the dotted box F6.3 does not exist.

In one embodiment, the dotted box F6.4 is optional.

In one subembodiment of the above embodiment, the dotted box F6.4 exists.

In one subembodiment of the above embodiment, the dotted box F6.4 does not exist.

Embodiment 7

Figure 7:
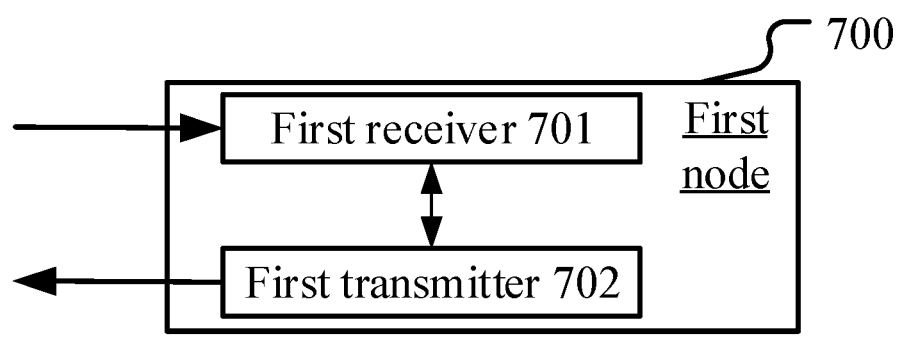
FIG. 7 illustrates a structure block diagram of a processing device in a first node according to one embodiment of the present disclosure.

Embodiment 7 illustrates a structure block diagram of a processing device in a first node according to one embodiment of the present disclosure, as shown in FIG. 7. In FIG. 7, a processing device 700 in a first node comprises a first receiver 701 and a first transmitter 702.

The first receiver 701 receives a first RRC message, the first RRC message comprises a first field, at least one second field and a third field; receives a second RRC message after receiving the first RRC message, the second RRC message comprises a second field and a fourth field; and determines whether the third field of the first RRC message is applied to the second field of the second RRC message according to the fourth field of the second RRC message;

in embodiment 7, the second field comprises a logical channel ID; the first RRC message is used to configure a cell group, and a cell group configured by the first RRC message is identified by the first field of the first RRC message; the fourth field and the first field are two different fields.

In one embodiment, the first RRC message is a CellGroupConfig IE, the first field is a CellGroupId field, and the second field is an RLC-BearerConfig field.

In one subembodiment of the above embodiment, a comment text tag of the third field is Need M.

In one subembodiment of the above embodiment, a comment text tag of the third field is Need N.

In one subembodiment of the above embodiment, a comment text tag of the third field is Need R.

In one subembodiment of the above embodiment, a comment text tag of the third field is Need S.

In one subembodiment of the above embodiment, a comment text tag of the third field is mac-CellGroupConfig.

In one subembodiment of the above embodiment, the third field comprises at least one of a mac-CellGroupConfig field, a physicalCellGroupConfig field, or a spCellConfig field.

In one embodiment, the first RRC message comprises an RRC message.

In one embodiment, the first RRC message comprises all or partial IEs in an RRC message.

In one embodiment, the first RRC message comprises all or partial fields in an IE in an RRC message.

In one embodiment, a cell group configured by the first RRC message comprises at least one of an MCG or an SCG.

In one embodiment, the first RRC message is a CellGroupConfig IE, the first field is a CellGroupId field, and the second field is an RLC-BearerConfig field.

In one embodiment, the second RRC message is a CellGroupConfig IE.

In one subembodiment of the above embodiment, the first field is not present in the second RRC message.

In one subembodiment of the above embodiment, the fourth field is not present in the first RRC message.

In one subembodiment of the above embodiment, a value range of the fourth field is the same as a value range of the first field.

In one embodiment, the second RRC message is a CellGroupConfig IE, the second field is an RLC-BearerConfig field, and the fourth field is a servedRadioBearer field.

In one embodiment, the second RRC message is a CellGroupConfig IE, the second field is an RLC-BearerConfig field, and the fourth field is an associatedServedRadioBearer field.

In one embodiment, the second RRC message is an RLC-BearerConfig field.

In one subembodiment of the above embodiment, the second field of the second RRC message is the second RRC message.

In one subembodiment of the above embodiment, the second field of the second RRC message comprises all or partial fields in the second RRC message.

In one subembodiment of the above embodiment, the second field of the second RRC message comprises all or partial field IEs in the second RRC message.

In one subembodiment of the above embodiment, the fourth field is a servedRadioBearer field.

In one subembodiment of the above embodiment, the fourth field is an associatedServedRadioBearer field.

In one embodiment, the fourth field of the second RRC message belongs to the second field of the second RRC message.

In one embodiment, the second RRC message is an rlc-BearerToAddModList field, and the second RRC message comprises one or a plurality of RLC-BearerConfig fields.

In one subembodiment of the above embodiment, the second field is an RLC-BearerConfig field, and the second field of the second RRC message is one of the one or a plurality of RLC-BearerConfig fields.

In one embodiment, a cell group configured by the second RRC message is associated with at least one of an MCG or an SCG.

In one embodiment, the second RRC message is used for a configuration of an RLC entity, a connection with a PDCP entity and a corresponding logical channel in MAC.

In one embodiment, the second RRC message is used for configuring at least one of an RLC entity, an association with a PDCP entity or a corresponding logical channel in MAC.

In one subembodiment of the above embodiment, the corresponding logical channel in MAC is a logical channel corresponding to an RLC entity configured by the second RRC message.

In one subembodiment of the above embodiment, the association with a PDCP entity indicates a radio bearer served by an RLC entity configured by the second RRC message.

In one embodiment, the third RRC message is received before receiving the first RRC message.

The first transmitter 702 transmits a fourth RRC message.

In one embodiment, the fourth RRC message is used to confirm a successful completion of the first RRC message.

In one embodiment, the fourth RRC message comprises all or part of an RRCReconfigurationComplete message.

The first transmitter 702 transmits a fifth RRC message.

In one embodiment, the fifth RRC message is used to confirm a successful completion of the second RRC message.

In one embodiment, the fifth RRC message comprises all or part of an RRCReconfigurationComplete message.

The first transmitter 702 transmits a sixth RRC message.

In one embodiment, the sixth RRC message is used to confirm a successful completion of the third RRC message.

In one embodiment, the sixth RRC message comprises all or part of an RRCReconfigurationComplete message.

In one embodiment, the first receiver 701 comprises the antenna 452, the receiver 454, the multi-antenna receiving processor 458, the receiving processor 456, the controller/processor 457, the memory 460 and the data source 467 in FIG. 4 of the present disclosure.

In one embodiment, the first receiver 701 comprises the antenna 452, the receiver 454, the multi-antenna receiving processor 458 and the receiving processor 456 in FIG. 4 of the present disclosure.

In one embodiment, the first receiver 701 comprises the antenna 452, the receiver 454 and the receiving processor 456 in FIG. 4 of the present disclosure.

In one embodiment, the first transmitter 702 comprises the antenna 452, the transmitter 454, the multi-antenna transmitting processor 457, the transmitting processor 468, the controller/processor 459, the memory 460, and the data source 467 in FIG. 4 of the present disclosure.

In one embodiment, the first transmitter 702 comprises the antenna 452, the transmitter 454, the multi-antenna transmitting processor 457 and the transmitting processor 468 in FIG. 4 of the present disclosure.

In one embodiment, the first transmitter 702 comprises the antenna 452, the transmitter 454 and the transmitting processor 468 in FIG. 4 of the present disclosure.

Embodiment 8

Figure 8:
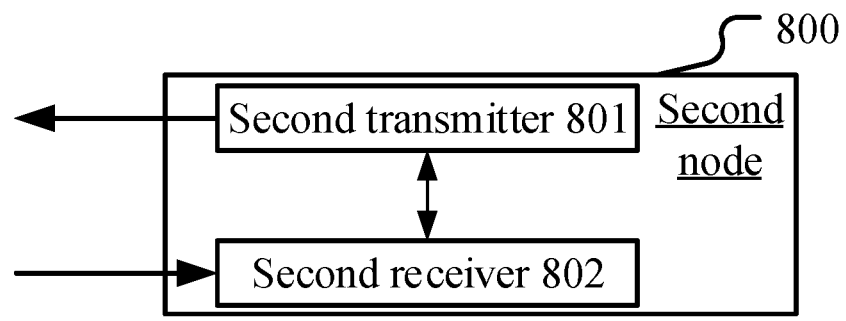
FIG. 8 illustrates a structure block diagram of a processing device in a second node according to one embodiment of the present disclosure.

Embodiment 8 illustrates a structure block diagram of a processing device in a second node according to one embodiment of the present disclosure, as shown in FIG. 8. In FIG. 8, a processing device 800 in the second node comprises a second transmitter 801 and a second receiver 802.

The second transmitter 801 transmits a first RRC message, the first RRC message comprises a first field, at least one second field and a third field; and transmits a second RRC message after transmitting the first RRC message, the second RRC message comprises a second field and a fourth field; determines whether the third field of the first RRC message is applied to the second field of the second RRC message according to the fourth field of the second RRC message;

in embodiment 8, the second field comprises a logical channel ID; the first RRC message is used to configure a cell group, and a cell group configured by the first RRC message is identified by the first field of the first RRC message; the fourth field of the second RRC message is used to determine whether the third field of the first RRC message is applied to the second field of the second RRC message; the fourth field and the first field are two different fields.

In one embodiment, the third RRC message is transmitted before transmitting the first RRC message.

The second receiver 802 receives a fourth RRC message.

The second receiver 802 receives a fifth RRC message.

The second receiver 802 receives a sixth RRC message.

In one embodiment, the second transmitter 801 comprises the antenna 420, the transmitter 418, the multi-antenna transmitting processor 471, the transmitting processor 416, the controller/processor 475 and the memory 476 in FIG. 4 of the present disclosure.

In one embodiment, the second transmitter 801 comprises the antenna 420, the transmitter 418, the multi-antenna transmitting processor 471 and the transmitting processor 416 in FIG. 4 of the present disclosure.

In one embodiment, the second transmitter 801 comprises the antenna 420, the transmitter 418 and the transmitting processor 416 in FIG. 4 of the present disclosure.

In one embodiment, the second receiver 802 comprises the antenna 420, the receiver 418, the multi-antenna receiving processor 472, the receiving processor 470, the controller/processor 475 and the memory 476 in FIG. 4 of the present disclosure.

In one embodiment, the second receiver 802 comprises the antenna 420, the receiver 418, the multi-antenna receiving processor 472 and the receiving processor 470 in FIG. 4 of the present disclosure.

In one embodiment, the second receiver 802 comprises the antenna 420, the receiver 418 and the receiving processor 470 in FIG. 4 of the present disclosure.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, receiving a first RRC message, the first RRC message comprising a first field, at least one second field and a third field; receiving a second RRC message after receiving the first RRC message, the second RRC message comprising a second field and a fourth field; determining whether the third field of the first RRC message is applied to the second field of the second RRC message according to the fourth field of the second RRC message;
wherein the second field comprises a logical channel identity (ID); the first RRC message is used to configure a cell group, and a cell group configured by the first RRC message is identified by the first field of the first RRC message; the fourth field and the first field are two different fields.

2. The first node according to claim 1, wherein the behavior of determining whether the third field of the first RRC message is applied to the second field of the second RRC message according to the fourth field of the second RRC message includes: if a value of the fourth field of the second RRC message is the same as a value of the first field of the first RRC message, the third field of the first RRC message is applied to the second field of the second RRC message; if a value of the fourth field of the second RRC message is different from a value of the first field of the first RRC message, the third field of the first RRC message is not applied to the second field of the second RRC message; the first field is not present in the second RRC message, or the fourth field is not present in the first RRC message.

3. The first node according to claim 1, wherein the first RRC message comprises at least one fourth field; the behavior of determining whether the third field of the first RRC message is applied to the second field of the second RRC message according to the fourth field of the second RRC message includes: if a value of the fourth field of the second RRC message is the same as a value of at least one the fourth field of the first RRC message, the third field of the first RRC message is applied to the second field of the second RRC message; if a value of the fourth field of the second RRC message is different from a value of any the fourth field of the first RRC message, the third field of the first RRC message is not applied to the second field of the second RRC message.

4. The first node according to claim 1, wherein the first RRC message comprises at least one fifth field; the behavior of determining whether the third field of the first RRC message is applied to the second field of the second RRC message according to the fourth field of the second RRC message includes: if a value of the fourth field of the second RRC message is the same as a value of at least one the fifth field of the first RRC message, the third field of the first RRC message is applied to the second field of the second RRC message; if a value of the fourth field of the second RRC message is different from a value of any the fifth field of the first RRC message, the third field of the first RRC message is not applied to the second field of the second RRC message.

5. The first node according to claim 1, wherein the third field is not present in the second RRC message.

6. The first node according to claim 2, wherein the third field is not present in the second RRC message.

7. The first node according to claim 3, wherein the third field is not present in the second RRC message.

8. The first node according to claim 4, wherein the third field is not present in the second RRC message.

9. The first node according to claim 1, wherein the first field is not present in the second RRC message.

10. The first node according to claim 1, wherein the second RRC message is a CellGroupConfig IE; the first field is not present in the second RRC message; and the fourth field is not present in the first RRC message.

11. The first node according to claim 1, wherein the fourth field of the second RRC message belongs to the second field of the second RRC message.

12. The first node according to claim 1, wherein the second RRC message is used for configuring at least one of an RLC entity, an association with a PDCP entity or a corresponding logical channel in MAC; the corresponding logical channel in MAC is a logical channel corresponding to an RLC entity configured by the second RRC message; the association with a PDCP entity indicates a radio bearer served by an RLC entity configured by the second RRC message.

13. The first node according to claim 1, wherein the first RRC message comprises a plurality of second fields, and the one second field is one of the plurality of second fields.

14. The first node according to claim 13, wherein at least second field of the first RRC message comprises the fourth field, and a first radio bearer is identified by the fourth field in at least one second field of the first RRC message.

15. The first node according to claim 1, wherein a logical channel identified by a logical channel ID in at least one second field of the first RRC message belongs to a PTM branch of a first radio bearer; a logical channel identified by a logical channel ID in the second field of the second RRC message belongs to a PTP branch of a second radio bearer.

16. The first node according to claim 15, wherein a scheduling signaling of the first RRC message in an air interface is identified by a non-unicast RNTI; a scheduling signaling of the second RRC message in an air interface is identified by a unicast RNTI.

17. The first node according to claim 1, wherein a logical channel identified by a logical channel ID in at least one second field of the first RRC message belongs to a PTP branch of a first radio bearer; a logical channel identified by a logical channel ID in the second field of the second RRC message belongs to a PTM branch of a second radio bearer.

18. The first node according to claim 1, wherein a scheduling signaling of the first RRC message in an air interface is identified by a unicast RNTI; a scheduling signaling of the second RRC message in an air interface is identified by a non-unicast RNTI.

19. A second node for wireless communications, comprising:
a second transmitter, transmitting a first RRC message, the first RRC message comprising a first field, at least one second field and a third field; and transmitting a second RRC message after transmitting the first RRC message, the second RRC message comprising a second field and a fourth field;
wherein the second field comprises a logical channel ID; the first RRC message is used to configure a cell group, and a cell group configured by the first RRC message is identified by the first field of the first RRC message; the fourth field of the second RRC message is used to determine whether the third field of the first RRC message is applied to the second field of the second RRC message; the fourth field and the first field are two different fields.

20. A method in a first node for wireless communications, comprising:
receiving a first RRC message, the first RRC message comprising a first field, at least one second field and a third field; receiving a second RRC message after receiving the first RRC message, the second RRC message comprising a second field and a fourth field; determining whether the third field of the first RRC message is applied to the second field of the second RRC message according to the fourth field of the second RRC message; wherein the second field comprises a logical channel ID; the first RRC message is used to configure a cell group, and a cell group configured by the first RRC message is identified by the first field of the first RRC message; the fourth field and the first field are two different fields.

* * * * *